(12) United States Patent
Silverstein et al.

(10) Patent No.: US 7,621,641 B1
(45) Date of Patent: *Nov. 24, 2009

(54) HIGH LUMINANCE DISPLAY APPARATUS USING LCD PANEL

(75) Inventors: Barry D. Silverstein, Rochester, NY (US); Andrew F. Kurtz, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 409 days.

This patent is subject to a terminal disclaimer.

(21) Appl. No.: 11/292,759

(22) Filed: Dec. 1, 2005

Related U.S. Application Data

(63) Continuation-in-part of application No. 11/194,974, filed on Aug. 2, 2005.

(51) Int. Cl.
*G03B 21/14* (2006.01)
*G03B 21/26* (2006.01)
*G02F 1/1335* (2006.01)
*H04N 5/74* (2006.01)
*G02B 27/14* (2006.01)
*G02B 27/12* (2006.01)

(52) U.S. Cl. .............. 353/20; 353/33; 353/37; 353/82; 353/84; 353/94; 348/750; 348/758; 359/634; 359/638; 359/640; 349/9

(58) Field of Classification Search .......... 353/20, 353/30, 31, 33, 34, 37, 81, 82, 84, 94, 98, 353/99, 102; 348/742–744, 750, 757, 758; 359/618, 629, 633, 634, 636, 638–640; 362/19; 349/7–9

See application file for complete search history.

(56) References Cited

U.S. PATENT DOCUMENTS

| | | | |
|---|---|---|---|
| 4,127,322 A | 11/1978 | Jacobson et al. |
| 4,191,456 A | 3/1980 | Hong et al. |
| 4,343,535 A | 8/1982 | Bleha, Jr. |
| 4,653,867 A | 3/1987 | Urabe et al. |
| 5,729,245 A | 3/1998 | Gove et al. |
| 5,758,940 A | 6/1998 | Ogino et al. |
| 5,798,819 A | 8/1998 | Hattori et al. |
| 5,808,795 A | 9/1998 | Shimomura et al. |
| 5,889,614 A | 3/1999 | Cobben et al. |
| 5,918,961 A | 7/1999 | Ueda |
| 6,010,221 A | 1/2000 | Maki et al. |
| 6,062,694 A | 5/2000 | Oikawa et al. |

(Continued)

*Primary Examiner*—Rochelle-Ann J Blackman
(74) *Attorney, Agent, or Firm*—Nelson Adrian Blish

(57) ABSTRACT

A projection apparatus (10) has an LC modulator panel (60) with photoresponsive layer, segmented into at least first, second, and third portions, each spatially separated. An image writing section (120) forms a first, second, or third image within the corresponding portion of the LC modulator panel by scanning successive lines of image writing light to energize the photoresponsive layer (316). The image writing section has at least one grating electromechanical system for modulating incident emission from a narrow-band light source (70) by providing diffracted and non-diffracted orders and a scanning element for directing a line of light thus formed toward the LC modulator panel to energize the photoresponsive layer. An illumination section (130) directs first, second, and third illumination beams for modulation by the respective portions of the LC modulator panel. A polarizing beamsplitter (24r, 24g, 24b), associated with each portion, polarizes and directs the illumination beams toward the LC modulator panel and directs modulated light toward a projection lens (62).

51 Claims, 16 Drawing Sheets

U.S. PATENT DOCUMENTS

| | | |
|---|---|---|
| 6,113,239 A | 9/2000 | Sampsell et al. |
| 6,231,192 B1 | 5/2001 | Konno et al. |
| 6,280,034 B1 | 8/2001 | Brennesholtz |
| 6,505,940 B1 | 1/2003 | Gotham et al. |
| 6,585,378 B2 | 7/2003 | Kurtz et al. |
| 6,594,060 B2 | 7/2003 | Kowarz |
| 6,637,888 B1 * | 10/2003 | Haven .................. 353/31 |
| 6,676,260 B2 | 1/2004 | Cobb et al. |
| 6,758,565 B1 | 7/2004 | Cobb et al. |
| 6,793,351 B2 | 9/2004 | Nelson et al. |
| 6,808,269 B2 | 10/2004 | Cobb |
| 6,831,722 B2 | 12/2004 | Ishikawa et al. |
| 6,839,181 B1 | 1/2005 | Cobb et al. |
| 2004/0090679 A1 * | 5/2004 | Kowarz ................. 359/634 |
| 2004/0179158 A1 * | 9/2004 | Silverstein et al. ......... 349/117 |

* cited by examiner

HIGH LUMINANCE DISPLAY APPARATUS USING LCD PANEL

CROSS REFERENCE TO RELATED APPLICATIONS

This is a Continuation-in-Part of application Ser. No. 11/194,974, filed Aug. 2, 2005, entitled HIGH LUMINANCE DISPLAY APPARATUS USING LCD PANEL, by Silverstein et al.

FIELD OF THE INVENTION

This invention generally relates to electronic projection and more particularly relates to an electronic projection apparatus using LC modulator panel technology for forming a full color projection image.

BACKGROUND OF THE INVENTION

Liquid crystal (LC) technology has been successfully harnessed to serve numerous display applications, ranging from monochrome alphanumeric display panels, to laptop computers, and even to large-scale full color displays. As is well known, an LC device forms an image as an array of pixels by selectively modulating the polarization state of incident light for each corresponding pixel. Continuing improvements of LC technology have yielded the benefits of lower cost, improved yields and reliability, and reduced power consumption and with steadily improved imaging characteristics, such as resolution, speed, and color.

One type of LC display component, commonly used for laptops and larger display devices, is the so-called "direct view" LCD panel, in which a layer of liquid crystal is sandwiched between two sheets of glass or other transparent material. Improvements in thin-film transistor (TFT) technology have proved beneficial for direct view LCD panels, allowing increasingly denser packing of transistors into an area of a single glass pane. In addition, new LC materials that enable thinner layers and faster response time have been developed. This, in turn, has helped to provide direct view LCD panels having improved resolution and increased speed. Thus, larger, faster LCD panels having improved resolution and color are being designed and utilized successfully for full motion imaging.

Alternatively, miniaturization and the utilization of microlithographic technologies have enabled development of LC devices of a different type. Liquid crystal on silicon (LCOS) technology has enabled the development of highly dense spatial light modulators by sealing the liquid crystal material against the structured backplane of a silicon circuit. Essentially, LCOS fabrication combines LC design techniques with complementary metal-oxide semiconductor (CMOS) manufacturing processes.

Using LCOS technology, LC chips having imaging areas typically smaller than one square inch are capable of forming images having several million pixels. The relatively mature level of silicon etching technology has proved to be advantageous for the rapid development of LCOS devices exhibiting high speeds and excellent resolution. LCOS devices have been used as spatial light modulators in applications such as rear-projection television and business projection apparatus.

With the advent of digital cinema and related electronic imaging opportunities, considerable attention has been directed to development of electronic projection apparatus. In order to provide a competitive alternative to conventional cinematic-quality film projectors, digital projection apparatus must meet high standards of performance, providing high resolution, wide color gamut, high brightness, and frame-sequential contrast ratios exceeding 1,000:1. LCOS LCDs appear to offer advantages as spatial light modulators for high-quality digital cinema projection systems. These advantages include relatively large device size, small gaps between pixels, and favorable device yields.

Referring to FIG. 1, there is shown a simplified block diagram of a conventional electronic projection apparatus 10 using LCOS LCD devices. Each color path (r=Red, g=Green, b=Blue) uses similar components for forming a modulated light beam. Individual components within each path are labeled with an appended r, g, or b, appropriately. Following the red color path, a red light source 20r provides unmodulated light, which is conditioned by uniformizing optics 22r to provide a uniform illumination. A polarizing beamsplitter 24r directs light having the appropriate polarization state to a spatial light modulator 30r which selectively modulates the polarization state of the incident red light over an array of pixel sites. The action of spatial light modulator 30r forms the red component of a full color image. The modulated light from this image, transmitted along an optical axis $O_r$ through polarizing beamsplitter 24r, is directed to a dichroic combiner 26, typically an X-cube or a Philips prism. Dichroic combiner 26 combines the red, green, and blue modulated images from separate optical axes $O_r/O_g/O_b$ to form a combined, multicolor image for a projection lens 32 along a common optical axis O for projection onto a display surface 40, such as a projection screen. Optical paths for blue and green light modulation are similar. Green light from green light source 20g, conditioned by uniformizing optics 22g is directed through a polarizing beamsplitter 24g to a spatial light modulator 30g. The modulated light from this image, transmitted along an optical axis $O_g$, is directed to dichroic combiner 26. Similarly blue light from blue light source 20b, conditioned by uniformizing optics 22b is directed through a polarizing beamsplitter 24b to a spatial light modulator 30b. The modulated light from this image, transmitted along an optical axis $O_b$, is directed to dichroic combiner 26.

Among examples of electronic projection apparatus that utilize LCOS LCD spatial light modulators with an arrangement similar to that of FIG. 1 are those disclosed in U.S. Pat. Nos. 5,808,795 (Shimomura et al.); 5,798,819 (Hattori et al.); 5,918,961 (Ueda); 6,010,221 (Maki et al.); 6,062,694 (Oikawa et al.); 6,113,239 (Sampsell et al.); and 6,231,192 (Konno et al.)

As each of the above-cited patents shows, developers of motion-picture quality projection apparatus have primarily directed their attention and energies to LCOS LCD technology, rather than to solutions using TFT-based, direct view LC panels. There are a number of clearly obvious reasons for this. For example, the requirement for making projection apparatus as compact as possible argues for the deployment of miniaturized components, including miniaturized spatial light modulators, such as the LCOS LCDs or other types of compact devices such as digital micromirrors. The highly compact pixel arrangement, with pixels typically sized in the 10-20 micron range, allows a single LCOS LCD to provide sufficient resolution for a large projection screen, requiring an image in the range of 2048×1024 or 4096×2048 pixels or better as required by Society of Motion Picture and Television Engineers (SMPTE) specifications for digital cinema projection. Other reasons for interest in LCOS LCDs over their direct-view LCD panel counterparts relates to performance attributes of currently available LCOS components, attributes such as response speed, color, and contrast.

Yet another factor that tends to bias projector development efforts toward miniaturized devices relates to the dimensional characteristics of the film that is to be replaced. That is, the image-forming area of the LCOS LCD spatial light modulator, or its digital micromirror device (DMD) counterpart, is comparable in size to the area of the image frame that is projected from the motion picture print film. This may somewhat simplify some of the projection optics design. However, this interest in LCOS LCD or DMD devices also results from an unquestioned assumption on the part of designers that image formation at smaller dimensions is most favorable. Thus, for conscious reasons, and in line with conventional reasoning and expectations, developers have assumed that the miniaturized LCOS LCD or DMD provides the most viable image-forming component for high-quality digital cinema projection.

One problem inherent with the use of miniaturized LCOS and DMD spatial light modulators relates to brightness and efficiency. As is well known to those skilled in the imaging arts, any optical system is constrained by the Lagrange invariant. A product of the area of the light-emitting device and the numerical aperture of the emitted light, the LaGrange invariant is an important consideration for matching the output of one optical system with the input of another and determines output brightness of an optical system. In simple terms, only so much light can be provided from an area of a certain size. As the Lagrange invariant shows, when the emissive area is small, a large angle of emitted light is needed in order to achieve a certain level of brightness. Added complexity and cost result from the requirement to handle illumination at larger angles. This problem is noted and addressed in commonly assigned U.S. Pat. Nos. 6,758,565 (Cobb et al.); 6,808,269 (Cobb); and 6,676,260 (Cobb et al.). These patents disclose electronic projection apparatus design using higher numerical apertures at the spatial light modulator for obtaining the necessary light while reducing angular requirements elsewhere in the system.

A related consideration is that image-forming components also have limitations related to energy density. With miniaturized spatial light modulators, and with LCOS LCDs in particular, only so much energy density can be tolerated at the component level. That is, a level of brightness beyond a certain threshold level can damage the device itself. Typically, energy density above about 15 W/cm$^2$ would be excessive for an LCOS LCD. This, in turn, constrains the available brightness when using an LCOS LCD of 1.3 inch in diameter to no more than about 15,000 lumens. Heat build-up must also be prevented, since this would cause distortion of the image and color aberrations, and could shorten the lifespan of the light modulator and its support components. In particular, the behavior of polarization components that are sensitive to thermally induced stress birefringence would be significantly compromised by heat build-up. This requires substantial cooling mechanisms for the spatial light modulator itself and careful engineering considerations for supporting optical components. Again, this adds cost and complexity to optical system design.

Still other related problems with LCOS LCDs relate to the high angles of modulated light needed. The mechanism for image formation in LCD devices and the inherent birefringence of the LCD itself limit the contrast and color quality available from these devices when incident illumination is highly angular. In order to provide suitable levels of contrast, one or more compensator devices must be used in an LCOS system. This, however, further increases the complexity and cost of the projection system. An example of this is disclosed in commonly assigned U.S. Pat. No. 6,831,722 (Ishikawa et al.), which discloses the use of compensators for angular polarization effects of wire grid polarizers and LCD devices. For these reasons, it can be appreciated that LCOS LCD and DMD solutions face inherent limitations related to component size and light path geometry.

There have been various projection apparatus solutions proposed using the alternative direct view TFT LC panels. However, in a number of cases, these apparatus have been proposed for specialized applications, and are not intended for use in high-end digital cinema applications. For example, U.S. Pat. No. 5,889,614 (Cobben et al.) discloses the use of a TFT LC panel device as an image source for an overhead projection apparatus. U.S. Pat. No. 6,637,888 (Haven) discloses a rear screen TV display using a single subdivided TFT LC panel with red, green, and blue color sources, using separate projection optics for each color path. Commonly-assigned U.S. Pat. No. 6,505,940 (Gotham et al.) discloses a low-cost digital projector with a large-panel LC device encased in a kiosk arrangement to reduce vertical space requirements. While each of these examples employs a larger LC panel for image modulation, none of these designs is intended for motion picture projection at high resolution, having good brightness levels, color comparable to that of conventional motion picture film, acceptable contrast, and a high level of overall image quality.

One attempt to provide a projection apparatus using TFT LC panels is disclosed in U.S. Pat. No. 5,758,940 (Ogino et al.) In the Ogino et al. '940 apparatus, one or more Fresnel lenses is used to provide collimated illumination to the LC panel; another Fresnel lens then acts as a condenser to provide light to projection optics. Because it provides an imaging beam over a wide area, the Ogino et al. '940 apparatus is advantaged for its high light output, based on the Lagrange invariant described above. However, while it offers potential applications for TV projection apparatus and small-scale projectors, the proposed solution of the Ogino et al. '940 disclosure falls short of the performance levels necessary for high-resolution projection systems that modulate light and provide imaged light output having high intensity, at levels of 10,000 lumens and beyond.

Thus, it can be seen that, although digital cinema projection apparatus solutions have focused on the use of LCOS LCDs for image forming, there are inherent limitations in brightness and efficiency when using LCOS LCD components for this purpose. TFT LC panel solutions, meanwhile, would provide enhanced brightness levels over LCOS solutions. While projection apparatus using TFT LC panels have been disclosed, these have not been well suited to the demanding brightness requirements of high-performance digital cinema projection.

In cinema applications, the projector projects the modulated image onto a display screen or surface, where this surface may be at a variable distance from the projector. This requires that the projector provide some type of focus adjustment as well as color alignment adjustment. With conventional LCOS apparatus such as that shown in FIG. 1, color alignment is performed by color combining optics, so that the three composite RGB colors are projected along the same axis. However, for solutions using TFT devices, there may be benefits to providing separate projection optics for red, green, and blue paths. Some of these benefits include simpler and less costly lenses with color correction for a narrow wavelength band at each lens. With such an approach, some alignment method must then be provided to form the color image from properly superimposed red, green, and blue images, thereby allowing the projector to be used over a range of distances from a display screen.

Other problems relate to the nature of light modulation by the TFT LC device and to the support components necessary for high brightness applications requiring high levels of image quality. Conventional solutions would constrain both the light output levels and overall image quality, obviating the advantages afforded by TFT use for projection applications. For example, the use of absorptive polarizers that are directly attached to the TFT panels, as these devices are commonly provided from manufacturers, is disadvantageous for image quality. Heat absorption from these films, typically exceeding 20% of the light energy, causes consequent heating of the LCD materials, resulting in a loss of contrast and contrast uniformity.

Another problem inherent to TFT devices relates to constraints on fill factor. Each pixel site on a conventional TFT LCD has supporting electronics that limit the area available for light modulation. This problem, along with the use of absorptive polarizers noted above, places some restrictions on the amount of brightness that can be effectively achieved using conventional TFT LCDs.

Early solutions for electronic projection using liquid crystal light valves were not constrained by these difficulties, but had other limitations. The image light amplifier (ILA) designs, first proposed more than twenty years ago, employed a more primitive LC light valve device in which an image was formed on the LC light valve by a low intensity signal from a CRT. High intensity projection light was then provided from the opposite side of the LC light valve for modulation. A few examples of earlier designs using this approach are the following:

U.S. Pat. No. 4,343,535 (Bleha, Jr.) discloses an LC light valve having a photoresponsive layer and liquid crystal layer sandwiched between transparent electrodes, with a CRT providing an input image;

U.S. Pat. No. 4,127,322 (Jacobson et al.) discloses a system somewhat similar to that of the Bleha Jr. '535 patent, in which light valves are coupled directly to the face of their corresponding CRTs; and U.S. Pat. No. 4,191,456 (Hong et al.) discloses a full-color system with CRTs providing the image content for each of the red, green, and blue color channels.

In projection apparatus described in the Bleha Jr. et al. '535, Jacobson et al. '322, and Hong et al. '456 disclosures, the CRT itself constrained the available resolution of the projected image. An improved solution described in U.S. Pat. No. 4,653,867 (Urabe et al.) employs laser beams for increased resolution and improved writing speed.

The basic liquid crystal light valve used in the apparatus of U.S. Pat. Nos. 4,343,535; 4,127,322; 4,191,456; and 4,653,867 is simpler in design than today's TFT LC modulator, with variations on the basic LC light valve shown in FIG. 2. Here, a liquid crystal light valve 300 has a pair of transparent cover plates 302*a* and 302*b*, typically made of glass. Transparent electrodes 304*a* and 304*b*, typically formed from indium tin oxide (ITO) are on the corresponding inner surfaces of transparent cover plates 302*a* and 302*b*. Insulating films 306*a* and 306*b* isolate the inner liquid crystal layer 310 from transparent electrodes 304*a* and 304*b*. A dielectric mirror 312 is backed by a light blocking layer 314 for reflective operation; light blocking layer 314 and dielectric mirror 312 are not used for a transmissive device. A photoresponsive layer 316 is also provided for responding to the low-intensity image-forming light from the external CRT or laser source (not shown in FIG. 2).

While the approach illustrated in U.S. Pat. Nos. 4,343,535; 4,127,322; 4,191,456; and 4,653,867 provided some advantages for image brightness, however, a number of practical problems caused this approach to be superceded by designs employing LCOS devices. Certainly, the bulk and energy requirements of the CRT caused some difficulties. Conventional methods for laser modulation, required for the device in U.S. Pat. No. 4,653,867, proved cumbersome and impractical. These problems have thus far prevented the development of high performance, low cost projection apparatus using simplified LC devices.

Recent improvements in laser modulation technology have caused a renewal of interest in earlier design approaches in which the LC device is provided with an image from a separate excitation source. With the corresponding development of spatial light modulators that are more ideally suited to handle laser illumination, such as the electromechanical conformal grating device, termed a GEMS device, disclosed in U.S. Pat. No. 6,594,060 (Kowarz), for example, there is heightened interest in the possibility of providing image modulation with improved resolution using a large-panel LC device that can be inexpensively fabricated. However, workable solutions that take advantage of the flexibility, low cost, and inherent robustness of the GEMS device for LC device modulation have not been proposed.

Thus, it can be seen that there is a need for a full-color projection apparatus that takes advantage of inherent etendue-related advantages of LC devices and provides improved image quality.

SUMMARY OF THE INVENTION

It is an object of the present invention to provide a projection apparatus comprising:

a) an LC modulator panel, segmented into at least a first portion, a second portion, and a third portion, and wherein each portion is spatially separated from each other portion, the LC modulator panel comprising a photoresponsive layer;

b) an image-writing section for forming a first image within the first portion, a second image within the second portion and a third image within the third portion of the LC modulator panel by scanning successive lines of image-writing light to energize the photoresponsive layer thereby, the image writing section comprising:

(i) a narrow band light source for emitting a narrow band light;

(ii) at least one grating electromechanical system for modulating the narrow band light to provide modulated light in diffracted and non-diffracted orders;

(iii) a selecting element for blocking at least one order of the modulated light to provide a scanning light;

(iv) a scanning element for directing the scanning light toward the LC modulator panel to energize the photoresponsive layer;

c) an illumination section for directing first, second, and third illumination beams for modulation by the respective portions of the LC modulator panel; and d) a polarizing beamsplitter associated with each of the first, second, and third portions for providing first, second, and third polarized illumination beams, for directing the first, second, and third polarized illumination beams toward the LC modulator panel and for directing modulated light from the LC modulator panel toward a lens for projection toward a display surface.

It is a feature of the present invention that, unlike current approaches that use miniaturized LCOS LCDs, the apparatus of the present invention employs a single LCD panel, or multiple in-plane panels, for imaging in a projection apparatus intended for high-end electronic imaging applications.

It is an advantage of the present invention that it allows added brightness for the projected image, with simplified optics associated with a reduced-angle system. Various types of projection light sources could be used.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 3:
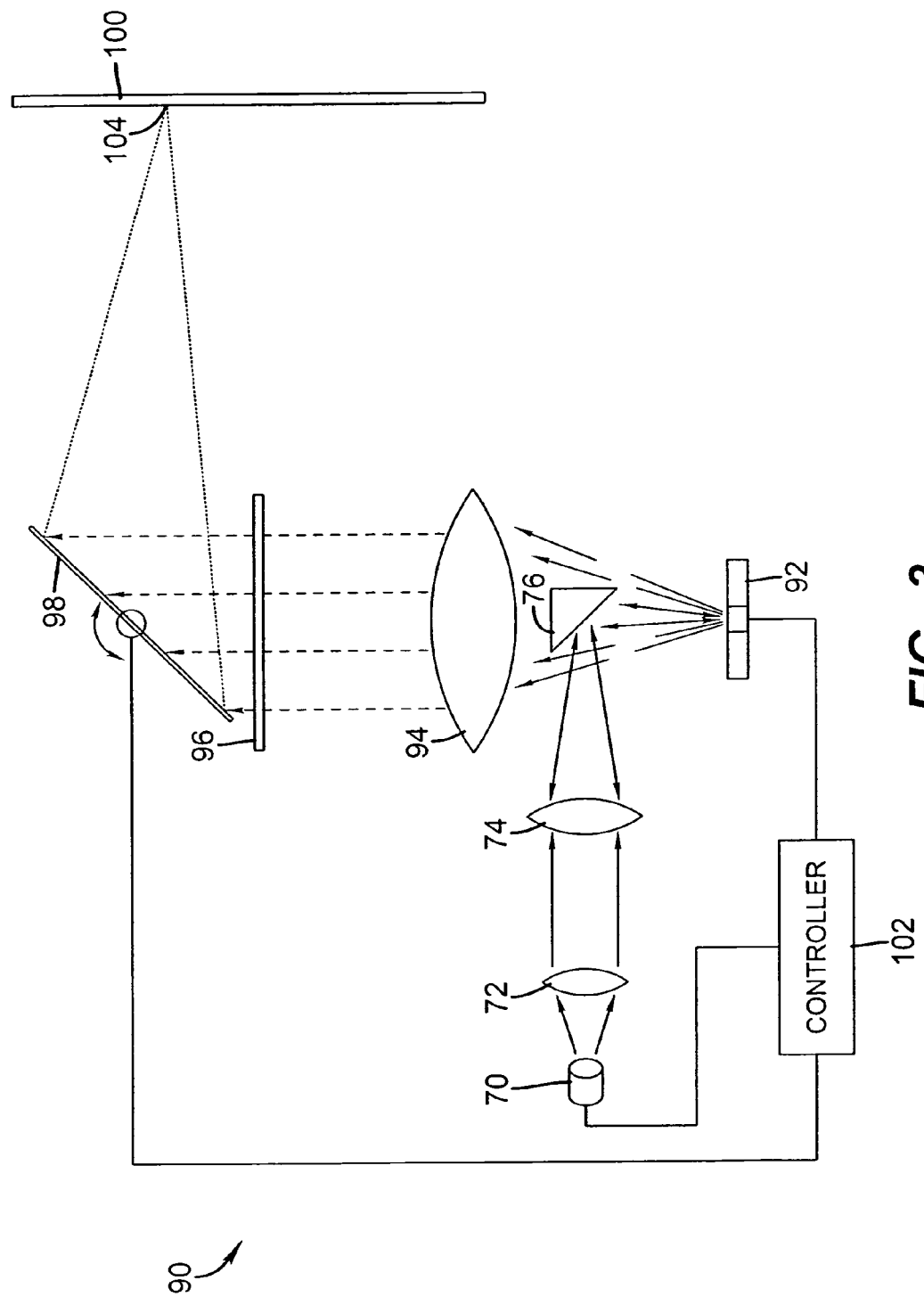
FIG. 3 is a schematic block diagram of a GEMS device and its supporting optics.

In order to better appreciate the operation of the present invention, it is useful to review the basic operation of a GEMS device. Referring to FIG. 3, there is shown an imaging apparatus 90 for forming an image using a GEMS modulator 92 that uses a linear array of conformal GEMS devices. Light emitted from a narrow-band light source 70, such as a laser or an array of lasers or other devices, is conditioned by a pair of lenses 72 and 74 before being redirected by a turning mirror 76 toward GEMS modulator 92. GEMS modulator 92, controlled by a signal from a control logic processor 102, forms an image one line at a time, by diffraction of the incident light. Non-zero diffractive orders are directed around a turning mirror 76 and to a projection lens 94. A scanning element 98, typically a galvo mirror or rotating prism, directs one line of modulated light 104 at a time onto a display surface 100. A cross-order filter 96 is disposed near the Fourier (focal) plane at distance "f" from projection lens 94 to minimize the effects of cross-order light from being directed toward display surface 100. Turning mirror 76 is one type of selecting element that is typically used for selectively blocking at least one order of light from GEMS modulator 92 (here, blocking the zeroeth order or undiffracted light) and allowing at least one other order of the light to be used for providing the image.

Figure 4:
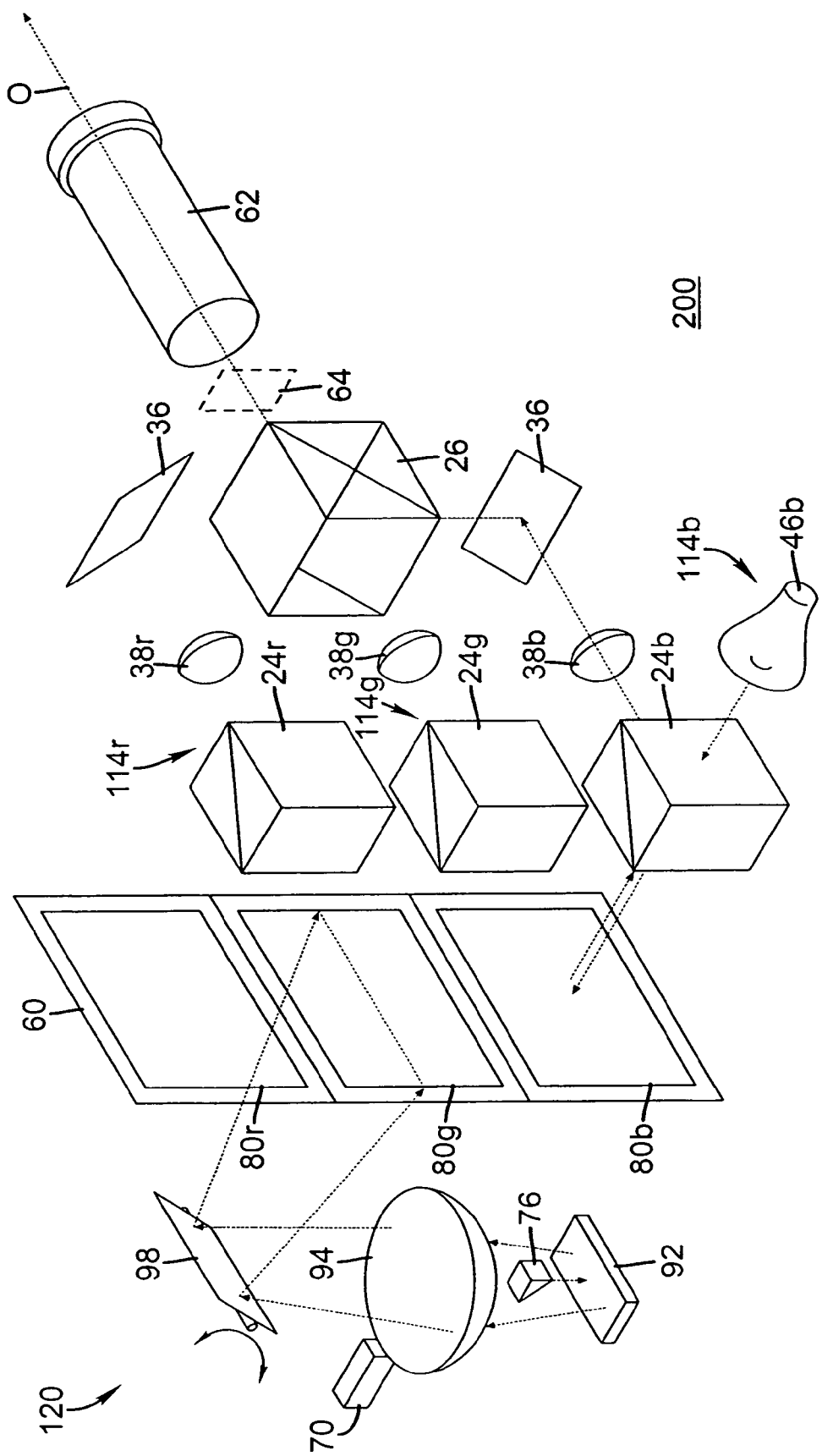
FIG. 4 is a perspective view of a projection apparatus in one embodiment of the present invention.

Referring to FIG. 4, there is shown, in perspective view, an embodiment of a projection apparatus 200 designed for large-scale, high-brightness projection applications according to an embodiment of the present invention. Unlike conventional projection apparatus described in the background section given above, projection apparatus 200 utilizes techniques to boost overall efficiency and light output, suited to the demanding requirements of high luminance projection. FIG. 4 is representative for a configuration in which a single LC modulator panel 60 is segmented into three portions, shown vertically stacked in FIG. 4. LC modulator panel 60 has a red component modulating section 80r, a green component modulating section 80g, and a blue component modulating section 80b. Each component modulating section 80r, 80g, and 80b serves as the light modulator in a corresponding component wavelength modulating section 114r, 114g, 114b. The path of illumination and modulated light is traced in dotted line form for component wavelength modulating section 114b. A blue light source 46b provides source illumination to a polarizing beamsplitter 24b. Light having the proper polarization state is transmitted to blue component modulating section 80b on LC modulator panel 60. Modulated light is then redirected by polarizing beamsplitter 24b toward a color path lens 38b and is then directed by a turning mirror 36 to a dichroic combiner 26, such as an X-cube or other arrangement using dichroic surfaces.

Referring again to FIG. 4, the path for green light modulation is similar. A green light source 46g (omitted to allow better visibility of other components) provides source illumination to a polarizing beamsplitter 24g. Light having the proper polarization state is transmitted to green component modulating section 80g on LC modulator panel 60. Modulated light is then redirected by polarizing beamsplitter 24g toward a color path lens 38g and is then directed to dichroic combiner 26. Similarly, for red light modulation, a red light source 46r (omitted to allow better visibility of other components) provides source illumination to a polarizing beamsplitter 24r. Light having the proper polarization state is transmitted to red component modulating section 80r on LC modulator panel 60. Modulated light is then redirected by polarizing beamsplitter 24r toward a color path lens 38r and is then directed by turning mirror 36 to dichroic combiner 26. Dichroic combiner 26 combines the modulated light from each component wavelength modulating section 114r, 114g, and 114b and directs the light along optical axis O toward a projection lens 62. The intermediate image 64 that is formed is imaged to the display surface 40 by projection lens 62. For forming the image onto LC modulator panel 60, an image writing section 120 employs a GEMS modulator 92 with narrow-band light source 70, and its support components as described with reference to FIG. 3, simplified in the representation of FIG. 4. Image writing section 120 scans one line of modulated light 104 at a time onto red, green, and blue component modulating sections 80r, 80g, and 80b, thereby energizing or exciting the LC material at each pixel site appropriately and generating an image.

Figure 5:
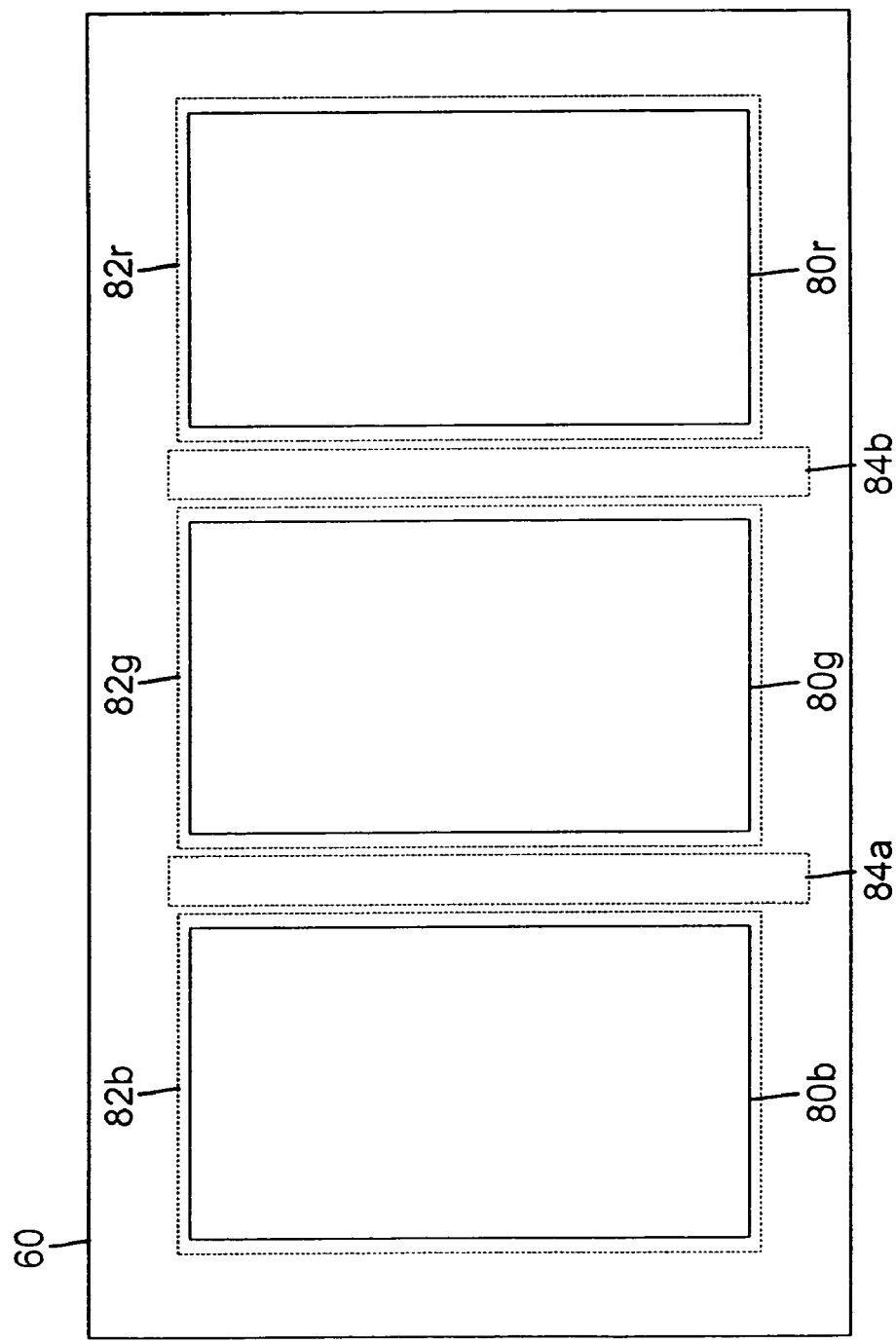
FIG. 5 is a plan view of a TFT LC device segmented according to the present invention.

One aspect of the present invention relates to the segmentation of monochrome liquid crystal modulator panel 60, as shown in the plan view of FIG. 5. The red, green, and blue component illumination colors are modulated by a red component modulating section 80r; a green component modulating section 80g, and a blue component modulating section 80b, respectively. In one embodiment, where LC modulator panel 60 yields a 1080×2048 pixel resolution, as defined externally by image writing section 120, each component color modulating section 80r, 80g, and 80b has 1080×2048 pixel resolution. Higher resolution alternatives, obtained by writing at higher resolution at image writing section 120, would be advantageous for applications such as digital cinema.

Each modulating section 80r, 80g, 80b can have a corresponding border portion 82r, 82g, 82b. Border portions 82r, 82g, 82b include some area that is nominally unused but is available to be used as part of modulating section 80r, 80g, 80b. Border portions 82r, 82g, 82b, usable for overscanning and adding resolution as stimulated by image writing section 120, may be used to facilitate alignment of the component color modulated light, as is described subsequently.

Each modulating section 80r, 80g, 80b is separated from its adjacent modulating section(s) 80r, 80g, 80b by a light blocking segment 84a, 84b. Light blocking segments 84a, 84b consist of opaque areas, light-blocking members, or pixels in a dark or black state, acting as masks for reflecting overlapping light from adjacent red, green, and blue illumination paths. Physical blocking elements may be used in addition to or in lieu of these dark state pixels.

The dimensions of LC modulator panel 60 can be optimized to suit the size and performance requirements of projection apparatus 200. In contrast to the miniaturized LCOS LCD solutions previously used, LC modulator panel 60 can be a large scale device larger than typical laptop displays, up to 17-20 diagonal inches or more, for example. The simplicity of LC modulator panel 60 design, as described with reference to FIG. 2, enables its straightforward fabrication, since no TFT electronics are required for forming individual pixel sites. Instead, LC modulator panel 60 can provide pixels of an arbitrary size, controlled by the excitation that is produced by image writing section 120. Ideally, LC modulator panel 60 can be sized so that it is just large enough such that the Lagrange-related constraints allow maximized lamp system efficiency of the corresponding light source 46r, 46g, 46b.

Figure 6:
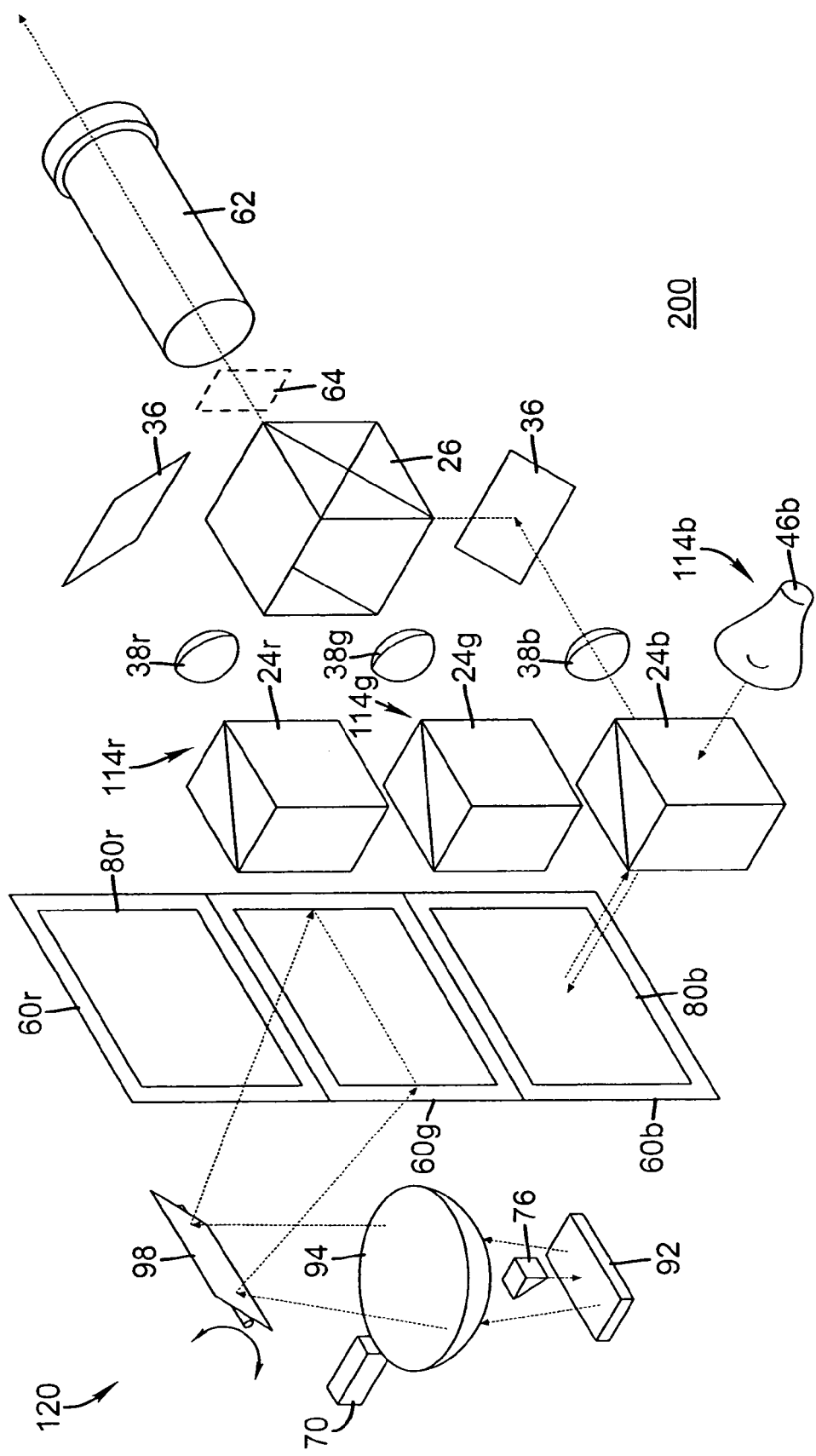
FIG. 6 is a perspective view of a projection apparatus in an alternate embodiment of the present invention using multiple in-line LC panels.

There are a number of alternative configurations that could be used, following the overall pattern shown in FIG. 4. Referring to FIG. 6, for example, there is shown an alternate configuration using multiple LC modulator panels 60r, 60g, and 60b, one for each color channel. Advantageously, the separate LC modulator panels 60r, 60g, and 60b can be arranged within the same plane (making them coplanar), as shown in the embodiment of FIG. 6. Each LC modulator panel 60r, 60g, and 60b contains a corresponding modulating section 80r, 80g, or 80b. For higher refresh speeds with the arrangement of FIG. 4 or 6, there can be multiple image writing sections 120, such as one or more for each color channel, for example.

Figure 2:
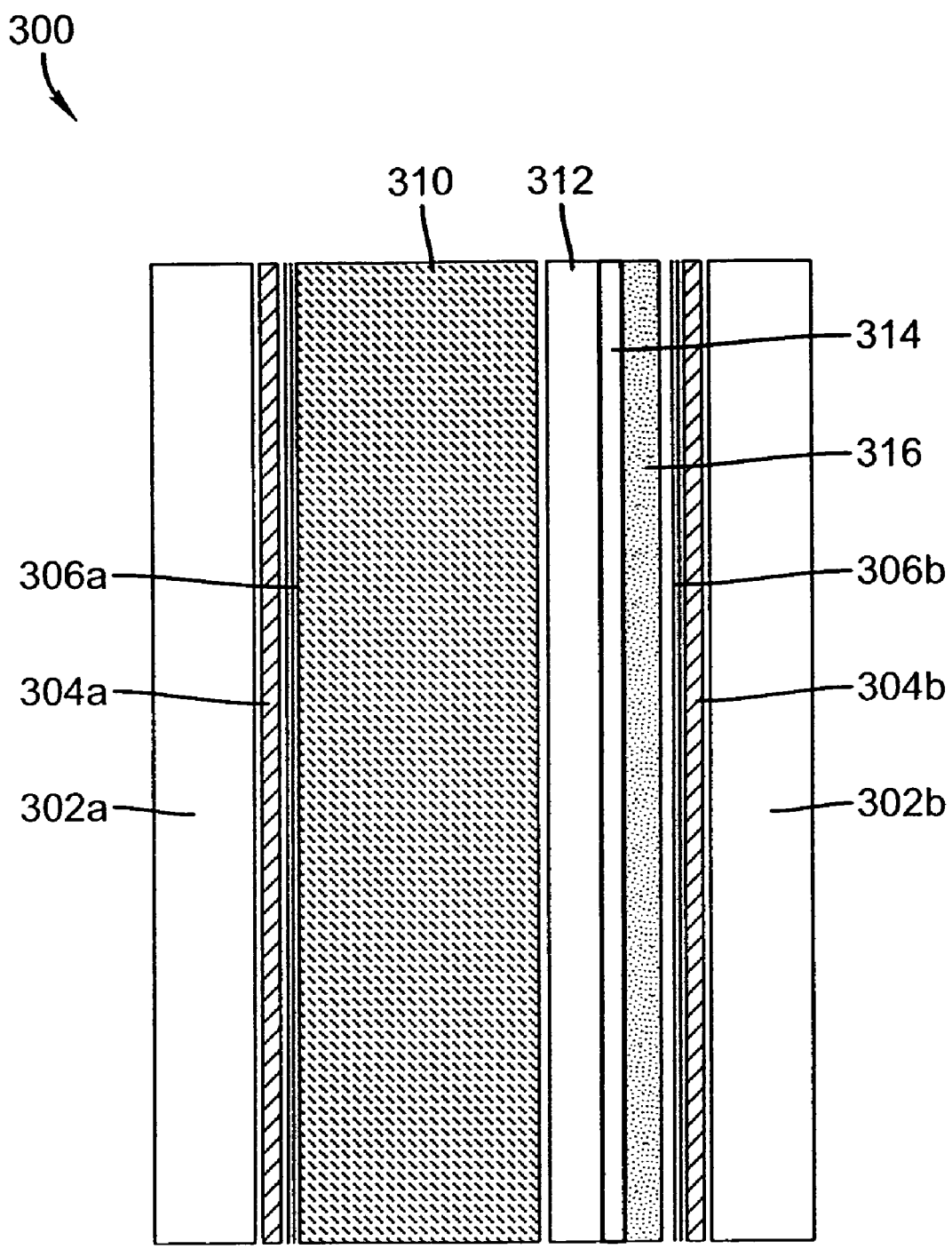
FIG. 2 is a schematic view in cross-section of an LCD device suitable for high luminance, high-resolution projection imaging.
Figure 7:
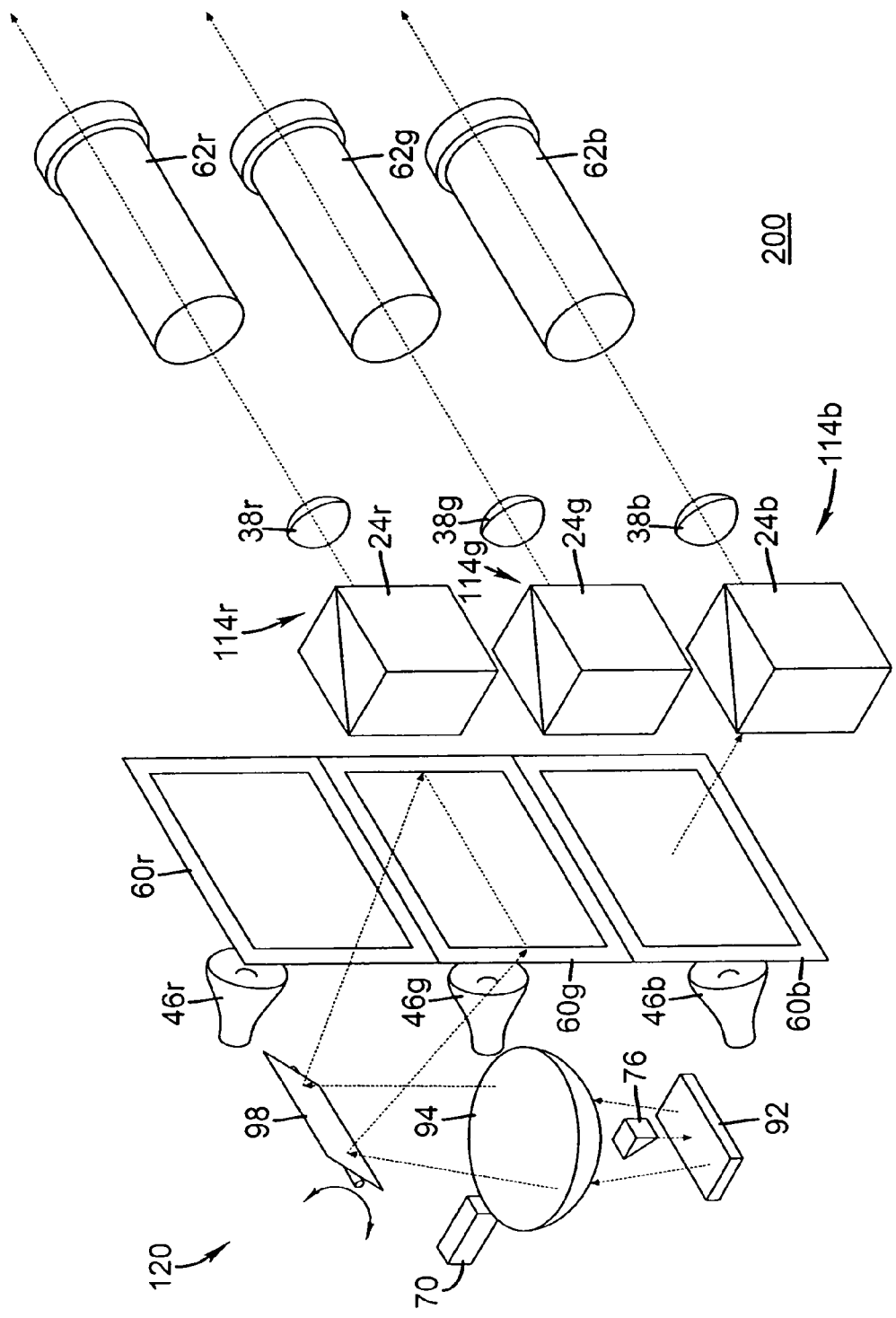
FIG. 7 is a perspective view of a projection apparatus in an alternate embodiment of the present invention using multiple transmissive in-line LC panels.

LC modulator panels 60, 60r, 60g, and 60b as shown in FIGS. 4 and 6 are reflective devices, fabricated as shown in FIG. 2. However, these components could alternately be transmissive devices, with illumination provided through LC modulator panels 60, 60r, 60g, and 60b. Referring to FIG. 7, there is shown an alternate embodiment wherein light sources 46r, 46g, 46b provide polarized light to their corresponding transmissive LC modulator panels 60r, 60g, 60b. Polarizing beamsplitters 24r, 24g, 24b are shown as wire grid polarizing beamsplitters, which could also be used in the embodiments shown in FIGS. 4 and 6. Wire grid polarizers of various types are commercially available from Moxtek, Inc., Orem, Utah. The wire grid type of polarizer is particularly advantaged for handling high levels of light intensity, unlike conventional types of absorptive polarizer. In one embodiment this wire grid polarizer would be placed such that its wire elements on its wire surface side face toward LC modulator panel 60 or 60r, 60g, or 60b. This configuration reduces thermally induced birefringence as disclosed in commonly-assigned U.S. Pat. No. 6,585,378 (Kurtz et al.) Polarizing beamsplitters 24r, 24g, 24b could alternately be conventional prism polarizers, such as a MacNeille polarizer, or a stacked film retarder, familiar to those skilled in the electronic imaging arts. A separate polarizing beamsplitter device could be used for each color, as shown in FIG. 4, for example. Alternately, a single polarizing beamsplitter could serve multiple color channels or serve for all component modulating sections 80r, 80g, 80b.

Another alternative also available with the FIGS. 4 and 6 embodiments is the use of a separate projection lens 62r, 62g, 62b for each color channel, as is shown in FIG. 7. Projection lenses 62r, 62g, and 62b would be aligned so that the projected red, green, and blue images converge on display surface 40 (not shown in FIG. 7).

Figure 8:
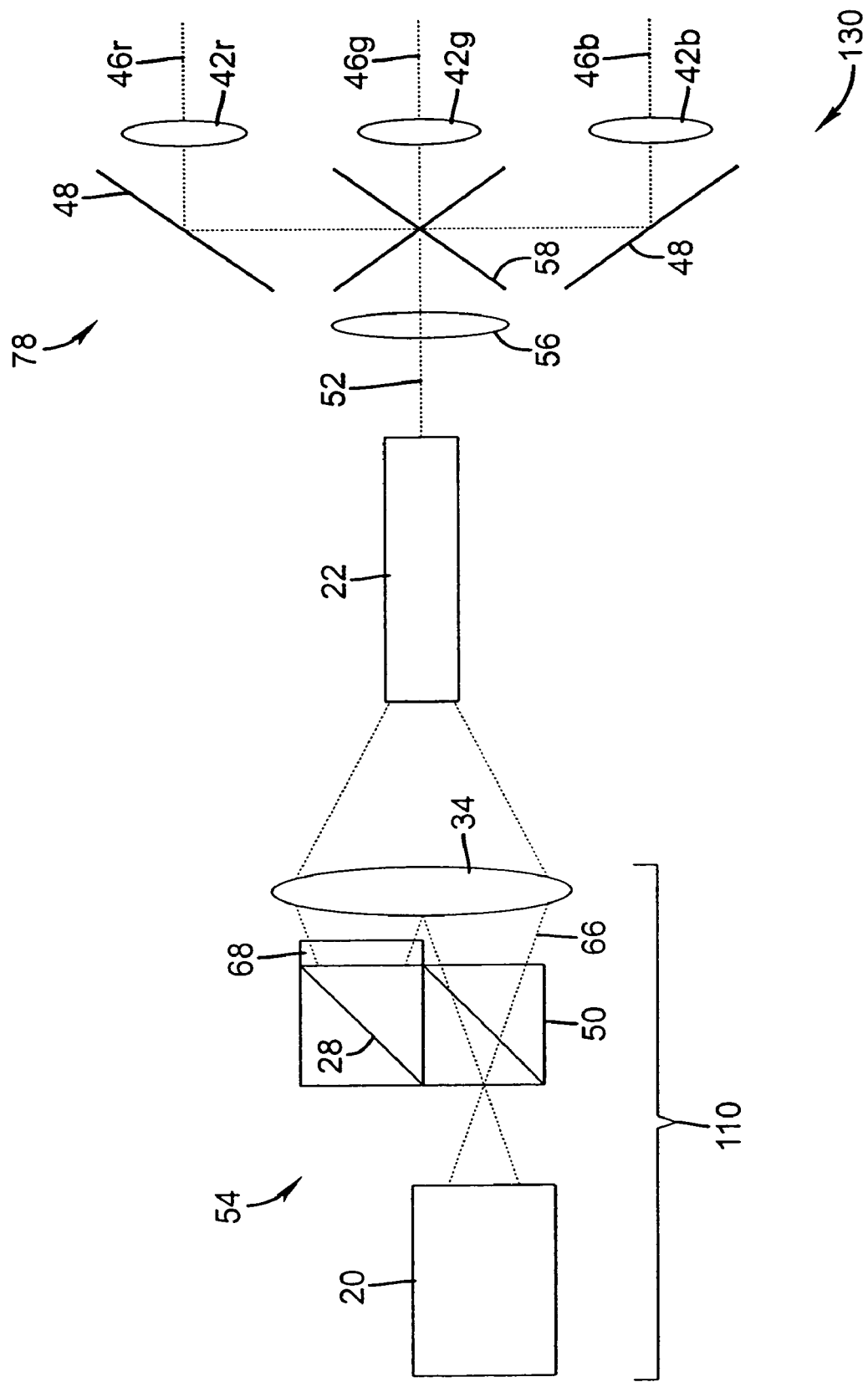
FIG. 8 is a block diagram showing an illumination apparatus in one embodiment.

Light sources 46r, 46g, and 46b provide polarized light that can originate at separate emissive sources, such as at separate LEDs, lasers, or filtered bulbs, for example. Alternately, a single emissive source can be used. FIG. 8 shows an illumination apparatus 130 with a polarized light providing apparatus 110 for providing polarized light to a color separator 78 that provides suitable polarized light having the appropriate wavelengths and uniform intensity for modulation. A light source 20 provides unpolarized illumination having multiple wavelengths, typically, white light. Light source 20 directs this illumination to a multiple wavelength polarizer 54 for providing a substantially polarized illumination beam 66. A lens 34 directs polarized illumination beam 66 to a uniformizing element 22 to provide a uniformized polarized beam 52 having multiple wavelengths. A condensing lens 56 then directs uniformized polarized beam 52 to a color separator 78 that uses a dichroic separator 58 and supporting reflective surfaces 48 for directing each component color wavelength through a lens 42r, 42g, 42b and along a separate illumination path as red, green, and blue light sources 46r, 46g, and 46b.

In polarized light providing apparatus 110, a polarizer 50 transmits light having p-polarization and reflects light having s-polarization. A mirror 28, or reflective polarization sensitive coating, then directs the light having s-polarization through a half wave plate 68. Half wave plate 68 converts this incident light to p-polarization. In this way, polarized illumination beam 66 at lens 34 has the same polarization state. Thus, substantially all of the light output from light source 20 is converted to light having the same polarization state for modulation.

The arrangement of illumination apparatus 130 shown in FIG. 8 provides light over a wider area and is particularly suitable for use with larger transmissive LC panels. It is instructive to observe that conventional LCOS LCD projection systems, limited by the LaGrange invariant, cannot fully take advantage of this type of light output. The improved light efficiency afforded by LC modulator panel 60 (FIG. 4) or panels 60r, 60b, 60g (FIGS. 6 and 7) can be utilized to provide a projection gamut that is substantially larger than that provided using conventional video, such as proposed Digital Cinema SMPTE gamut defined by (Red: 0.680 x, 0.320 y, 10.1 Y, Green: 0.265 x, 0.690 y, 34.6 Y, Blue: 0.150 x, 0.060 y, 3.31 Y), or even a substantially larger gamut that more closely approximates the gamut of motion picture film. Dichroic filters can be selected and positioned to block portions of the spectral bands between the typical component color bands blue, green, and red, thereby increasing the color space that projection apparatus 200 works within.

Figure 9:
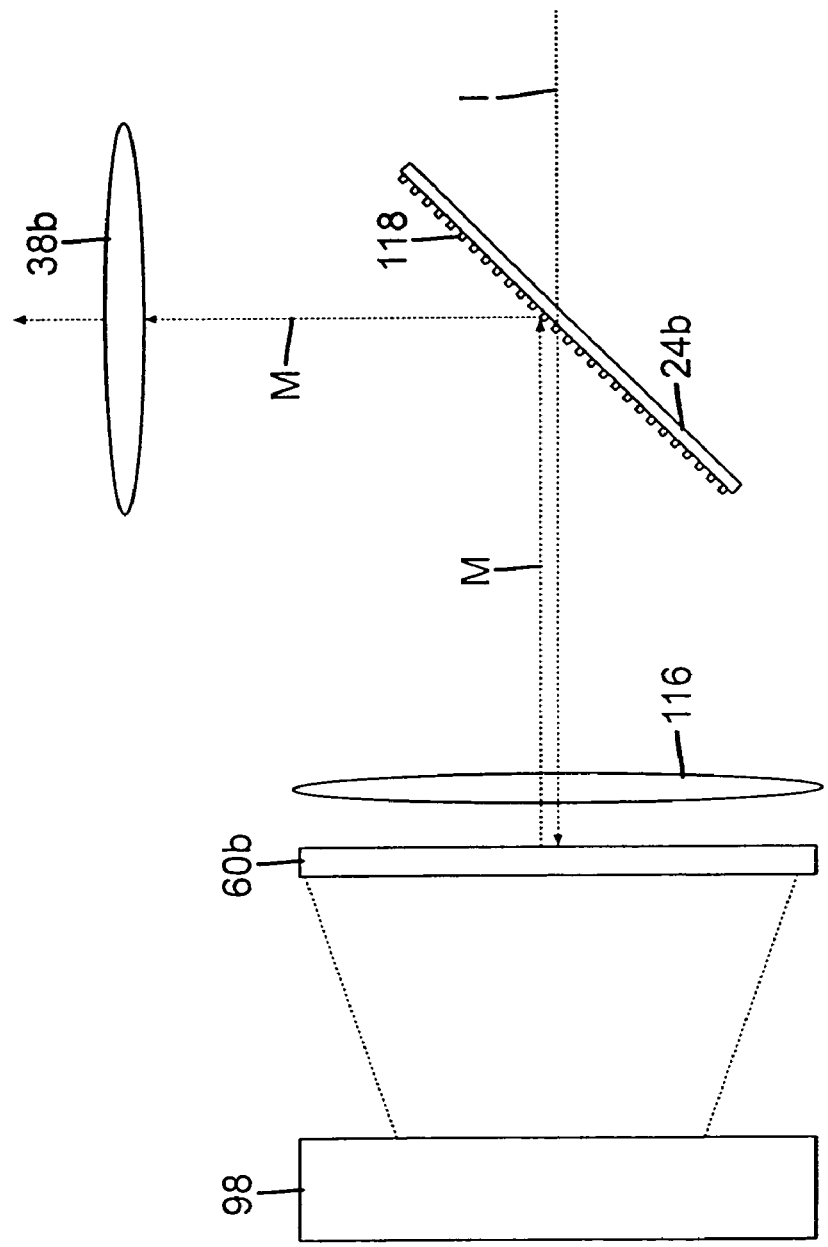
FIG. 9 is a schematic block diagram of a portion of a single color channel, for blue light modulation, from a top view.

FIG. 9 is a schematic block diagram of a portion of a single color channel, for blue light modulation in this example, from a top view. A polarized illumination beam I, such as blue light source 46b from FIG. 8, is transmitted through wire grid polarizer 24b, oriented with its grid 118 facing toward LC modulator panel 60b. An optional field lens 116 is provided in order to improve the incident angle of illumination beam I to LC modulator panel 60b. The deployment of field lens 116 with an LC spatial light modulator is described, for example, in commonly-assigned U.S. Pat. No. 6,839,181 (Cobb et al.) Field lens 116 could be a Fresnel lens, for example. LC modulator panel 60b receives its image content from scanning element 98, as was described earlier with reference to FIG. 4. A modulated beam M is then reflected by polarizing beamsplitter 24b and directed toward relay lens 38b.

Figure 10:
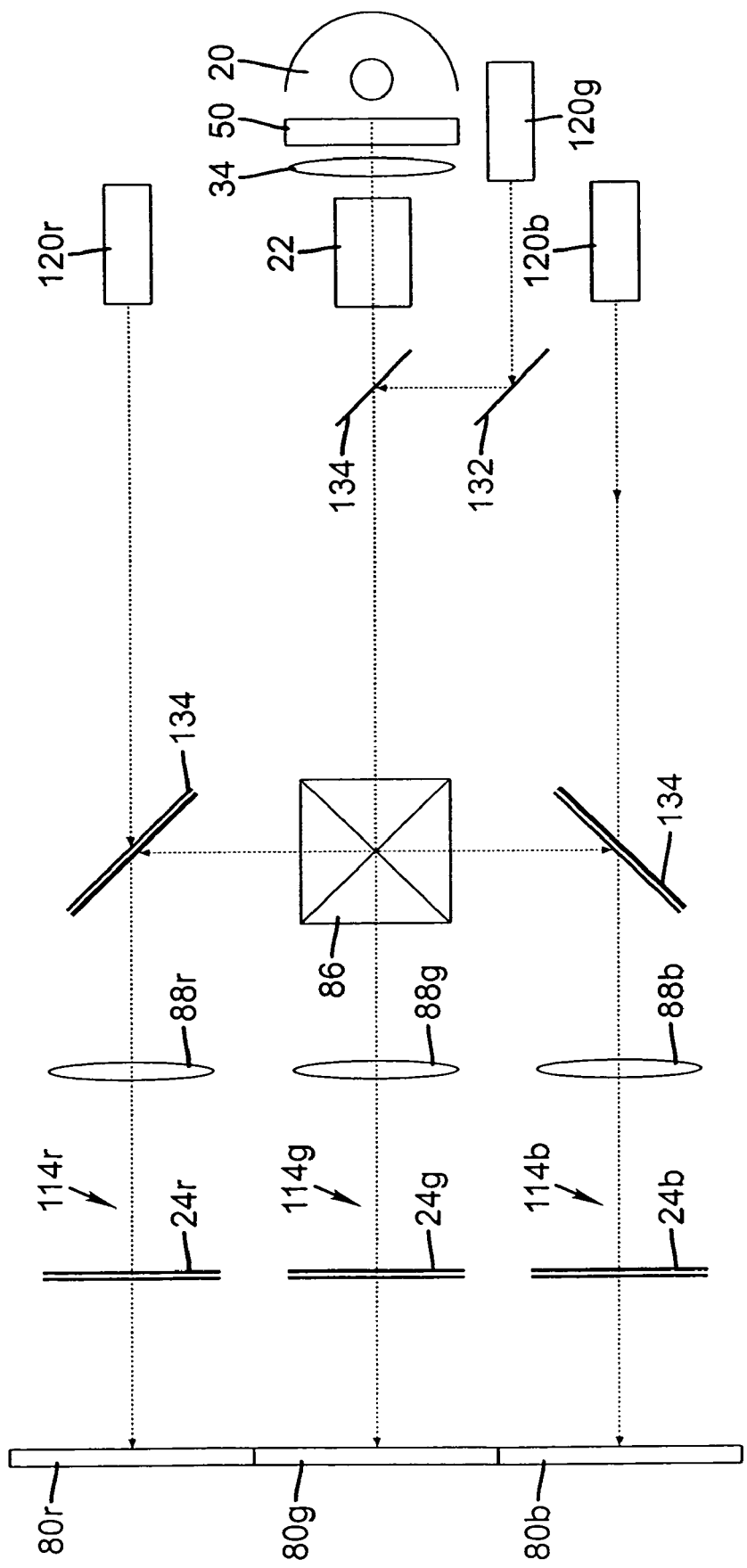
FIG. 10 is a block diagram of the illumination and image writing optics in one embodiment.

While separate optical paths can be used for forming the image on LC modulator panel 60 or panels 60r, 60b, 60g, there would be advantages in using the same optical components for providing illumination light and scanned image-forming light. Referring to FIG. 10, there is shown a block diagram of the illumination and image writing optics in one embodiment using reflective LC modulators. Illumination is provided by light source 20, polarizer 50, lens 34, and uniformizing optics 22, which deliver polarized, uniformized light to a dichroic separator 86, such as an X-cube, that splits the white light into its component colors for red, green, and blue component wavelength modulating sections 114r, 114g, 114b. Scanned image-forming light is provided by image writing sections 120r, 120g, and 120b. Dichroic surfaces 134 direct both the illumination and image-forming scanned light of different wavelength bands than the illumination light onto the same optical axis for each color channel, through a lens 88r, 88g, 88b. A mirror 132 is provided in the green color channel to direct light from image writing section 120g into the green optical path at dichroic surface 134. The path of modulated light in each color channel, not shown in FIG. 10, would follow the basic pattern shown in FIG. 4 or 7.

Among the numerous optional components that can be added to the embodiments shown and described with respect to FIGS. 4-10 are the following:

(i) Additional polarization and analyzer components disposed in the path of illumination or modulated light paths.

(ii) An antireflection coating applied to an outer surface of LC modulator panel 60 or panels 60r, 60g, 60b to reduce checkerboard effects and increase the ANSI contrast ratio, minimizing the interactions of neighboring pixels from stray light.

(iii) One or more Fresnel lenses added to each illumination path, for collimating the illumination provided to LC modulator panel 60 or panels 60r, 60g, 60b.

The embodiments in FIGS. 4-10 show projection apparatus 50 using the conventional set of red, green, and blue component colors. Other arrangements are possible, including the use of additional colors, to provide an enhanced color gamut. Or, different component colors could be used to form a color image. In an alternate embodiment using four or more colors, two LC modulator panels 60 could be used, each LC modulator panel 60 configured to have two or more component-color modulating sections.

Figure 13:
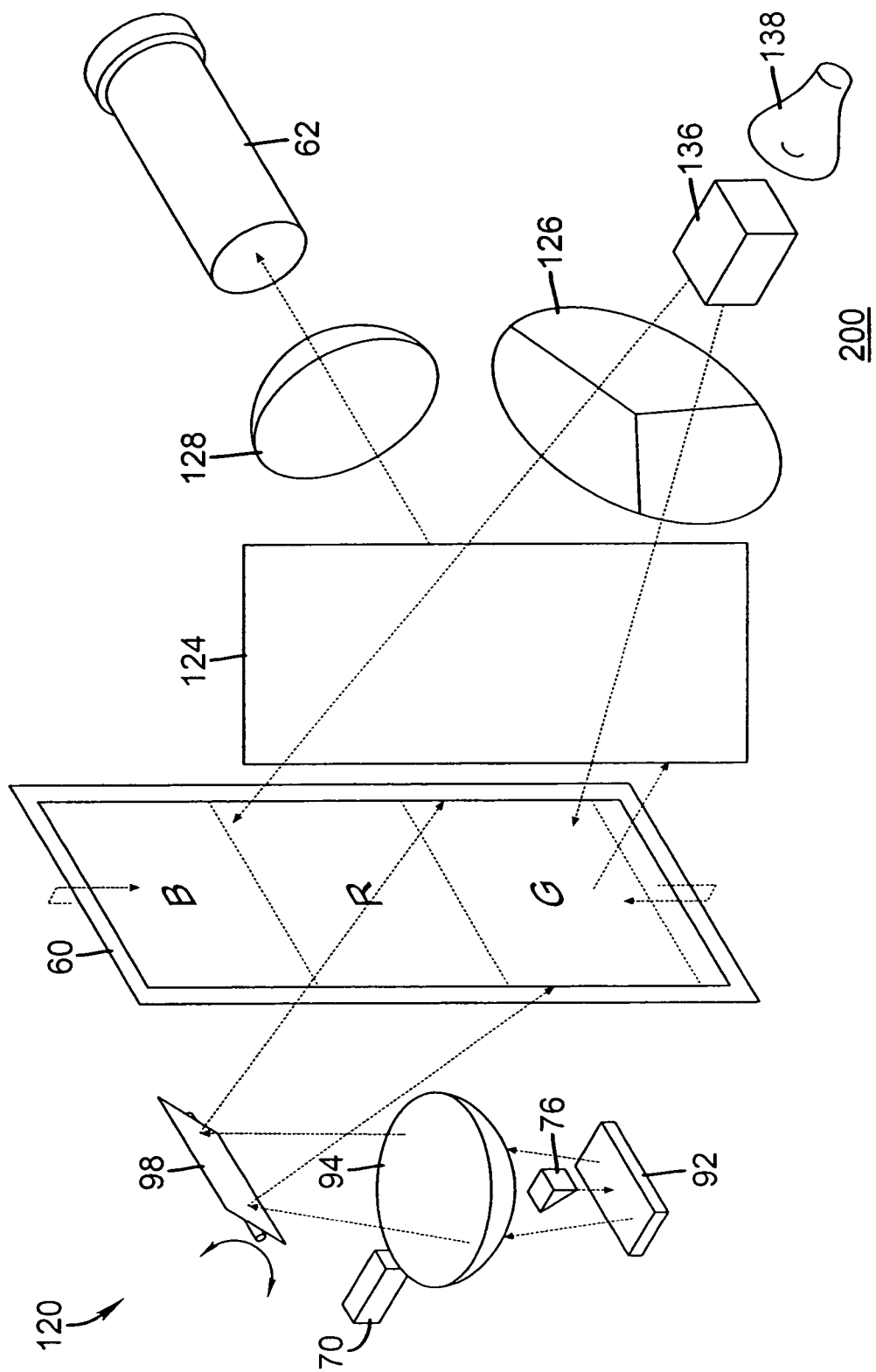
FIG. 13 is a schematic block diagram of an embodiment of the present invention using a color wheel.

In another alternative embodiment shown in FIG. 13, a rotating color filter wheel 126 or other type of color scrolling mechanism could be used to provide light to LC modulator panel 60 from a single light source 138. An integrator 136 and other conditioning optics are employed to provide a multi-color illumination beam, as bands of scrolled light, to LC modulator panel 60 through color filter wheel 126 and a beamsplitter 124. LC modulator panel 60 modulates the scrolled light and directs the modulated light back toward beamsplitter 124 and to a lens 128 and projection lens 62.

Illumination using color scrolling components could employ color separation, color scrolling and light-directing techniques similar to those disclosed in U.S. Pat. No. 6,280,034 (Brennesholtz), for example. Where color scrolling is used, a sequence utilizing repeated complementary pairs of colors may be particularly advantageous. In such an arrangement, one color scrolling element could be a filter wheel having a red, green, and blue filter for forming its set of colors. Another color scrolling element would then be a filter wheel or other device having a complementary cyan, magenta, and yellow filter for forming its set of colors. Two LC modulator panels would be used, with complementary colors provided simultaneously, so that the combined image would appear have all colors (that is, to appear as if in white light) during each part of the color scrolling sequence. Combining this approach with the advantages of enhanced brightness and improved imaging performance provided by the present invention would allow an expanded color gamut over earlier designs.

Figure 12:
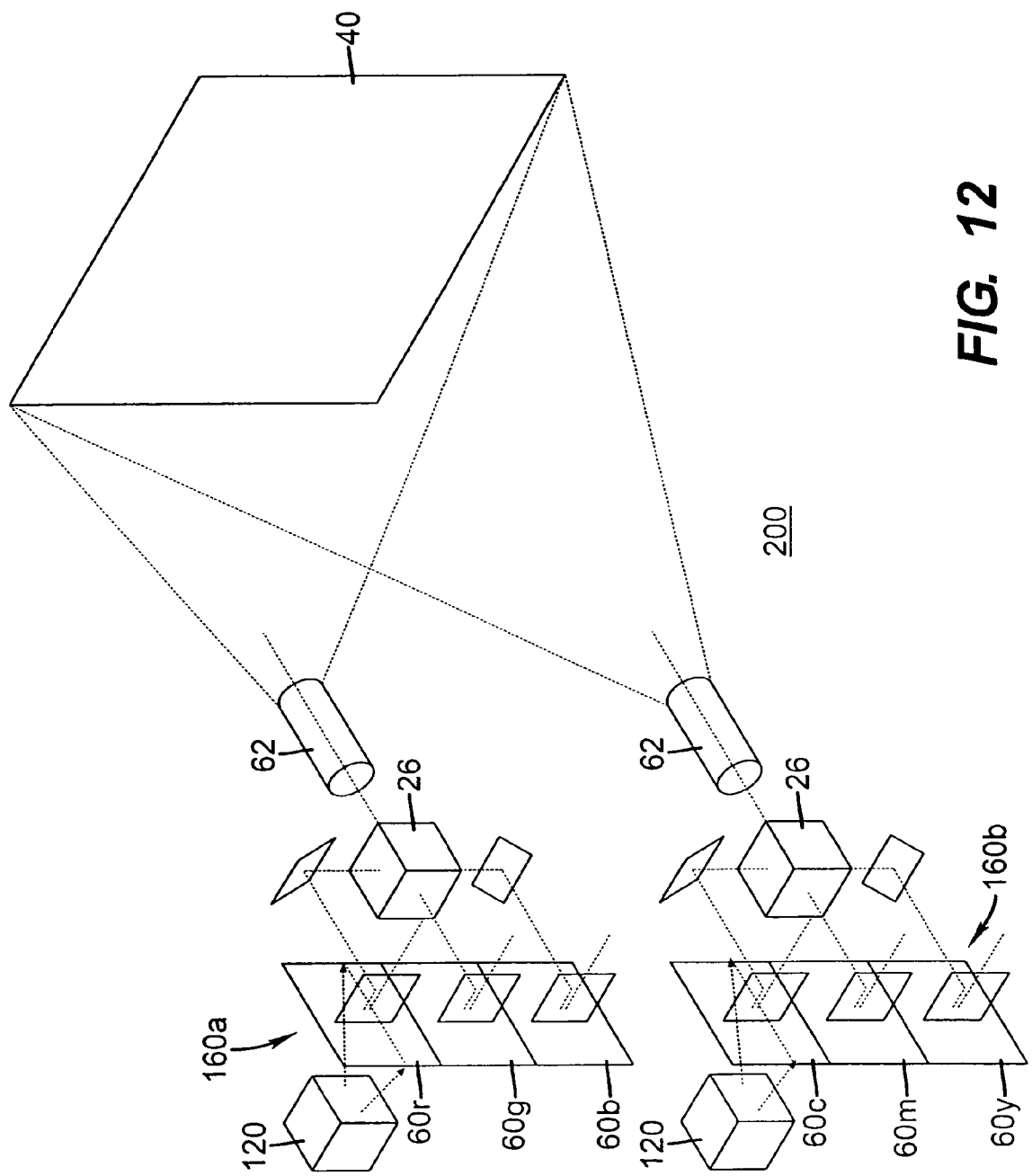
FIG. 12 is a block diagram showing a projection apparatus having enhanced color gamut.

Referring to FIG. 12, there is shown an alternate embodiment of projection apparatus 200 having an enhanced color gamut. In this embodiment, a projector section 160a with LC modulator panels 60r, 60g, 60b for additive colors red, green, and blue, respectively, works in cooperation with a projector section 160b that modulates using subtractive colors with LC modulator panels 60c for cyan, 60m for magenta, and 60y for yellow. When using an arrangement with both additive and subtractive complementaries, the various colors can be provided simultaneously as shown in FIG. 12 or in a scrolled sequence, as was described with reference to the disclosure of U.S. Pat. No. 6,280,034 noted above.

A notable improvement over conventional TFT LC projection apparatus is the use of uniformizing optics 22 for providing a uniform illumination from light source 20. Uniformizing optics 22 condition the output from light source 20 to provide a uniformly bright illumination beam for modulation. In one embodiment, an integrating bar provides uniformizing optics 22. Alternate embodiments include the use of a lenslet array or some combination of lenslet and other integrating components.

Light source 20 can be any of a number of types of lamp or other emissive component. It can be appreciated that it would be particularly advantageous to select a commercially available component as light source 20, to take advantage of low cost and availability due to high manufacturing volumes. In one embodiment, a conventional CERMAX® xenon arc lamp, available from PerkinElmer Inc., Wellesley, Mass., is used. In another embodiment, a conventional short arc xenon bubble lamp and elliptical reflector is used. The capability to use such off-the-shelf devices is a particular advantage when using a larger size TFT LC device, as opposed to using smaller LCOS components that typically require custom light source solutions designed to reduce the effective lamp LaGrange-related limitations. Other alternative light sources include high-power LEDs, which can be distributed in an array when using uniformizing optics 22. Another option is to use ultra-high pressure Mercury lamps, for example.

Control Loop for Projection Lens 62, 62r, 62g, 62b Alignment

Figure 11:
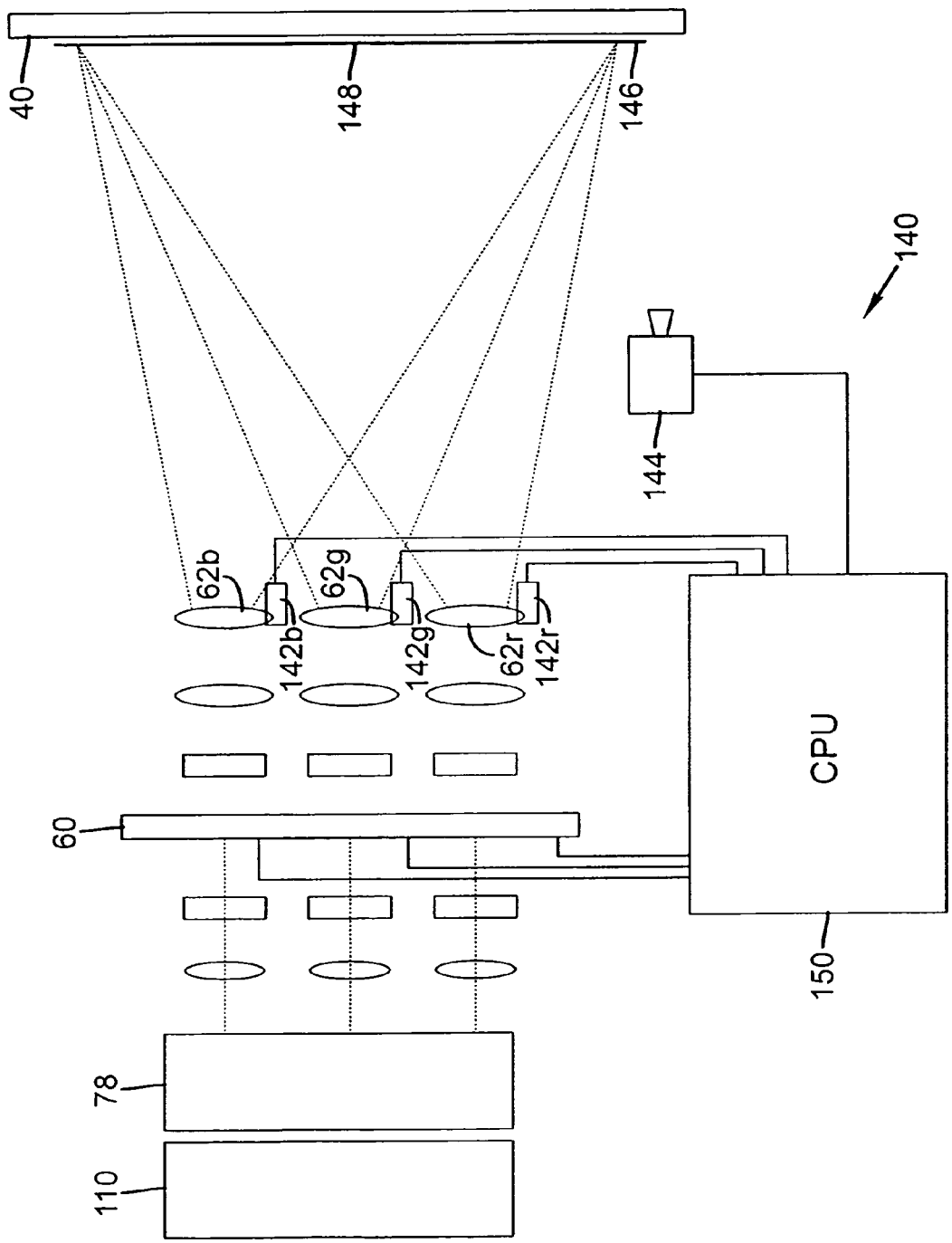
FIG. 11 is a block diagram showing a control loop for image alignment.

FIG. 11 shows a control loop 140 arranged for automated alignment of projection lenses 62r, 62g, and 62b when using an embodiment such as that shown in FIG. 7. A sensor 144, such as an electronic camera, senses light from a target 146 that may be part of an image 148 on display surface 40 or may be separated from image 148. Target 146 is devised to show proper overlap of the modulated component color images projected onto display surface 40. Methods such as those disclosed in commonly-assigned U.S. Pat. No. 6,793,351 (Nelson et al.) may be used to detect proper overlap at a control logic processor 150 and to counter any offset between colors detected by sensor 144. Adjustment of projection lenses 62r, 62g, and 62b may be effected using a combination of methods. Alignment in units of complete pixels can be accomplished electronically, in one direction by shifting the effective position(s) of the corresponding red, green, or blue component modulating sections 80r, 80g, and 80b, by shifting the scan data written by image writing section 120, using a method similar to that disclosed in U.S. Pat. No. 5,729,245 (Gove et al.) In the other diminution. The effective pixel position can be controlled by timing of the data associated with the scan galvo-mirror position. Corresponding actuators 142r, 142g, and 142b, such as stepping motors or piezoelectric actuators can be used to effect fine tuning alignment adjustment, either of full pixels or of fractional increments of a pixel, by moving projection lenses 62r, 62g, and 62b themselves. In one embodiment, a combination of the two methods is used, first attempting alignment by shifting the relative positions of one or more of red, green, or blue pixel positions on component modulating sections 80r, 80g, and 80b, utilizing and adjusting border portions 82r, 82g, and 82b as needed. Following this shifting of red, green, or blue pixels on component modulating sections 80r, 80g, and 80b, which is performed by image writing section 120, fine tuning adjustment is then performed by driving actuators 142r, 142g, and 142b as needed.

One advantage of the present invention is that compensators may not be needed, or at least that the need for compensators may be minimized. As is well known in the art, there are two basic types of compensator films. An uniaxial film with its optic axis parallel to the plane of the film is called an A-plate. An uniaxial film with its optic axis perpendicular to the plane of the film is called a C-plate. Alternately, the A-plate can be described as providing XY birefringence (an anisotropic medium with XY retardance) in the plane of the compensator, while the C-plate provides Z birefringence along the optical axis in the direction of beam propagation through the compensator. A uniaxial material with $n_e$ greater than $n_o$ is called positively birefringent. Likewise, a uniaxial material with $n_e$ smaller than $n_o$ is called negatively birefringent. Both A-plates and C-plates can be positive or negative depending on their $n_e$ and $n_o$ values. C-plates can be fabricated by the use of uniaxially compressed polymers or casting cellulose acetate, while A-plates can be made by stretched polymer films such as polyvinyl alcohol or polycarbonate.

The present invention minimizes or eliminates the need for C-plate compensators, since using the larger LC panels as modulator panel 60 results in reduced angles of light at the panel and, therefore, less contrast loss.

Figure 1:
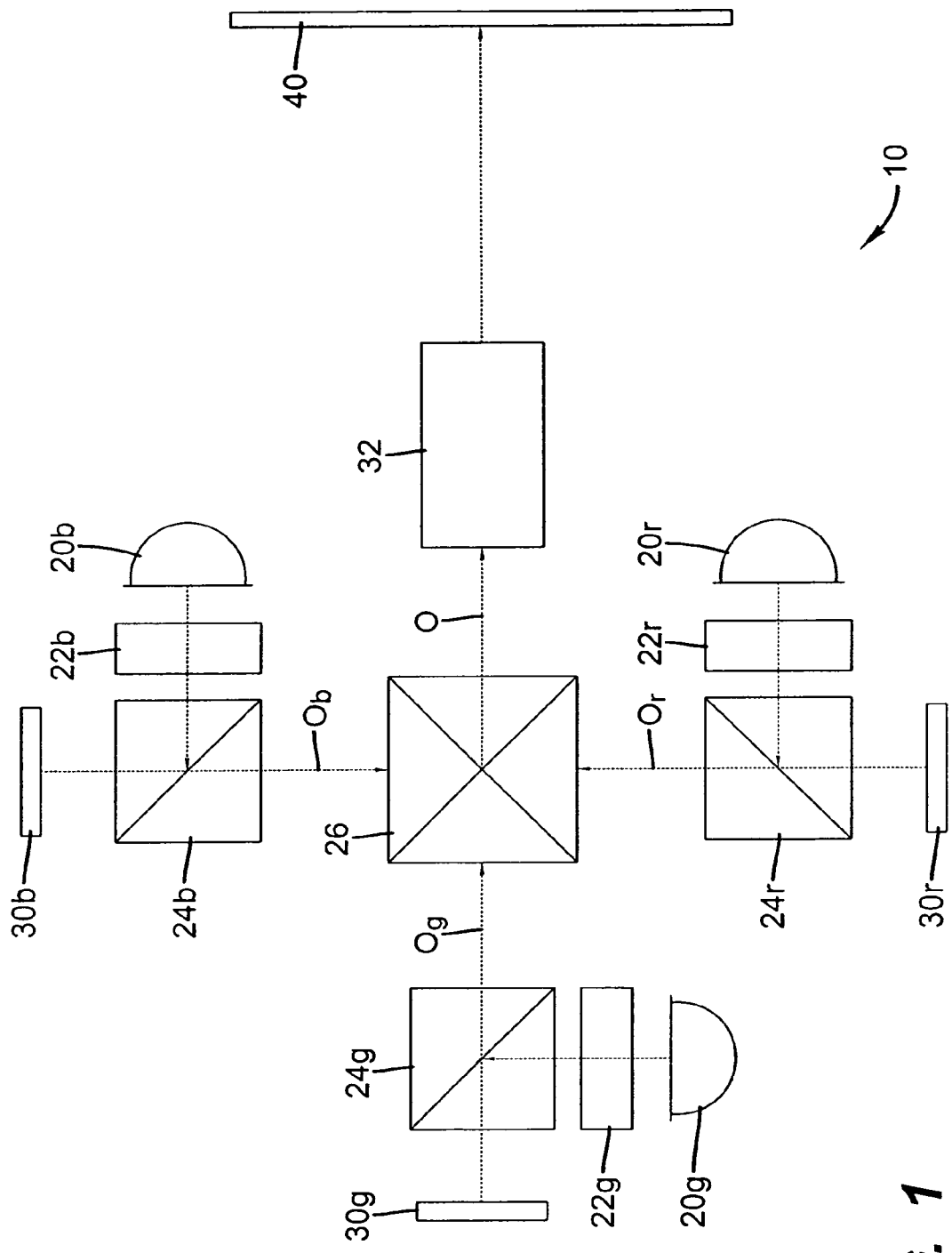
FIG. 1 is a block diagram showing a conventional projection apparatus using LCOS LCD devices.

By comparison with the conventional projection apparatus 10 in FIG. 1, the arrangement of projection apparatus 200, when adapted as described above, provides a system capable of considerably higher brightness levels. Where spatial light modulators 30r, 30g, and 30b of the conventional arrangement in FIG. 1 are miniaturized LCOS LC devices, the LaGrange invariant and energy-carrying capacity of these devices constrains the amount of brightness that is available to a range from about 5,000 to no more than about 25,000 lumens. The increased cost associated with increasing the LCOS chip size much beyond 1.7" diagonal is very prohibitive. In contrast, the embodiment of FIGS. 4, 6 and 7 enjoy an expanded luminance range, allowing projection in excess of 30,000 lumens in an apparatus that is considerably simpler in design than conventional electronic projection systems and is less costly. Fabrication of large, high quality LCD panels is straightforward and inexpensive, with continuing performance and cost improvements as the flat panel television market expands. The panel required for this method is in fact simpler in construction than that required for most flat-panel displays, as control of pixelization is externally applied.

With its capability for using brighter light sources and use of a large-area image generator, projection apparatus 200 using LC modulator panel 60 offers an overall efficiency on the order of 40-50%. This is in contrast to the typical efficiency of earlier LCOS LCD designs such as shown in FIG. 1, where efficiencies of no more than about 5 to 10% are common. Wire grid polarizers are particularly advantageous for increasing efficiency, since they exhibit relatively low light absorption. In general, a polarizer having light absorption of less than about 20% would be preferred. Improved performance may also be obtained by orienting the wire grid surface itself toward modulator panel 60 in the embodiments described above, as was described with reference to FIG. 9.

Alternate Embodiments Using Intermediate Image

A goal in optimizing projection apparatus 200 design is to reduce the cost, performance requirements, and overall complexity of system optics, particularly of projection optics. With this goal in mind, it can be beneficial to minimize the retrofocus distance of projection lens 62, thus minimizing its working distance requirements and resulting complexity.

Figure 14:
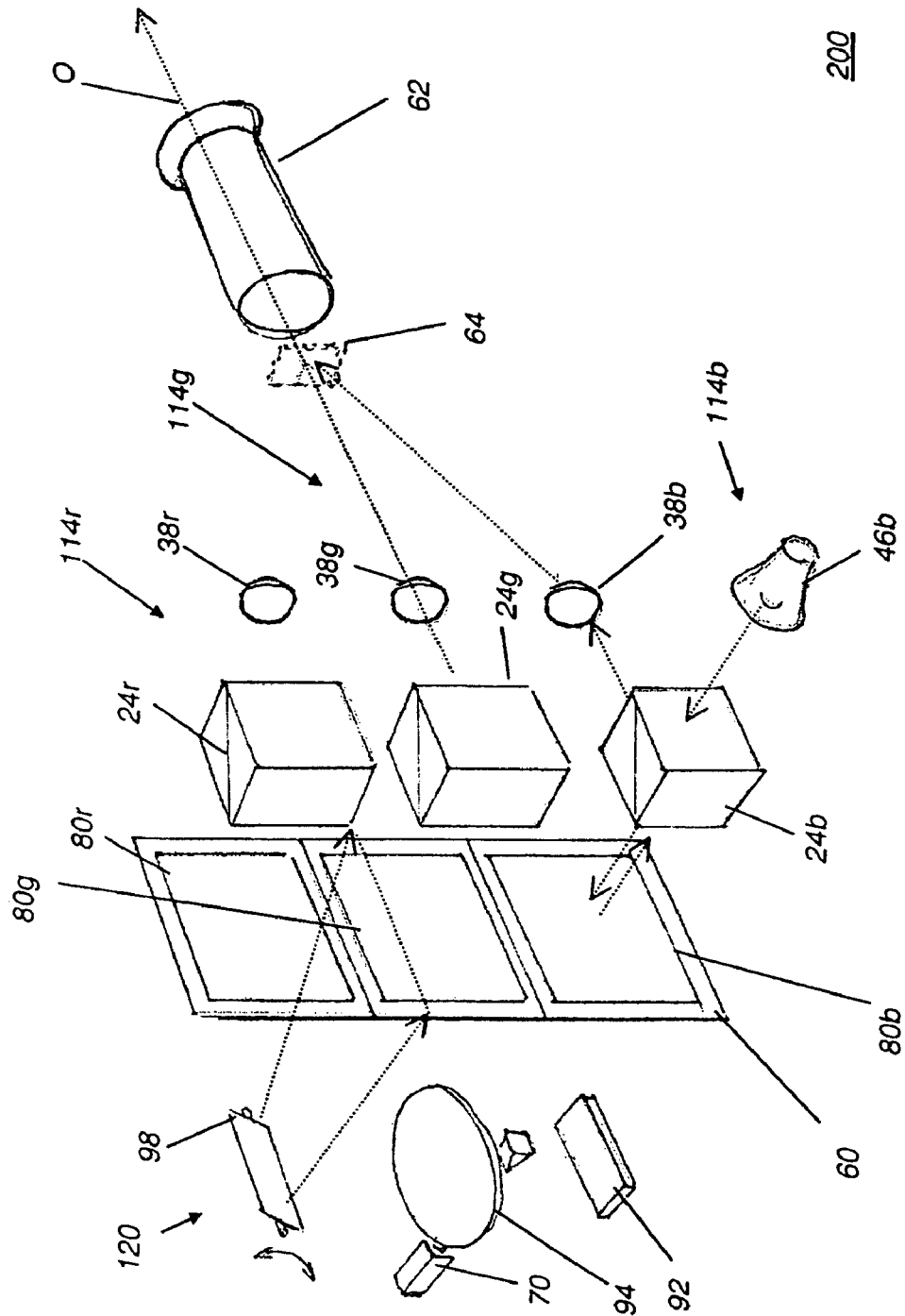
FIG. 14 is a perspective view of a projection apparatus in an alternate embodiment of the present invention for forming an intermediate image.

Referring to FIG. 14, there is shown, in perspective view, an embodiment of projection apparatus 200 designed for large-scale, high-brightness projection applications and using methods for reducing projection lens 62 requirements. In the embodiment shown, LC modulator panel 60 is segmented into three vertically stacked portions with red component modulating section 80r, green component modulating section 80g, and blue component modulating section 80b. As described with reference to FIG. 4, each component modulating section 80r, 80g, and 80b serves as the light modulator in a corresponding component wavelength modulating section 114r, 114g, 114b. The path of illumination and modulated light is traced in dotted line form for component wavelength modulating section 114b. Blue light source 46b provides source illumination to polarizing beamsplitter 24b. Light having the proper polarization state is transmitted to blue component modulating section 80b on LC modulator panel 60. Modulated light is then redirected by polarizing beamsplitter 24b toward color path lens 38b. Unlike the configuration of FIG. 4, color path lens 38b forms the blue component of intermediate image 64 as an image of blue component modulating section 80b on LC modulator panel 60. Red and green component wavelength modulating sections operate similarly, contributing to form intermediate image 64 as a multicolor image near the focal plane of projection lens 62. As is shown in FIG. 14, intermediate image 64 is placed at or near the focal plane of projection lens 62, allowing the use of slow projection optics with a small working distance. By contrast, projection lens 62 would need to be a fast lens with a large working distance in other embodiments. For example, projection lens 62 might otherwise need to have a large working distance that extends along the optical path back to each modulating section 80r, 80g, and 80b on LC modulator panel 60 if conventional techniques were used. Instead, forming an intermediate image at or near the focal plane of projection lens 62 as shown in FIG. 14 is advantaged for simplifying requirements and lowering the cost of projection optics. Moreover, this arrangement allows projection lens 62 to work at a higher f/#, with fewer lens elements and, consequently, with relaxed tolerances.

While a single segmented LC modulator panel 60 is shown, the arrangement of FIG. 14 in which intermediate image 64 is formed could alternately be used with multiple LC modulator panels, driven either by a single or multiple GEMS modulators 92, such as was described with reference to FIG. 6. When forming intermediate image 64, combining elements such as X-cube and other combining dichroic components are not required in the path of modulated light with this embodiment. Relay lenses 38r, 38g, and 38b may not be needed for forming intermediate image 64 in some embodiments. A dichroic combiner 26, as was shown with reference to FIGS. 4 and 6 for example, might alternately be used for combining modulated components of light in the imaging path.

Figure 15:
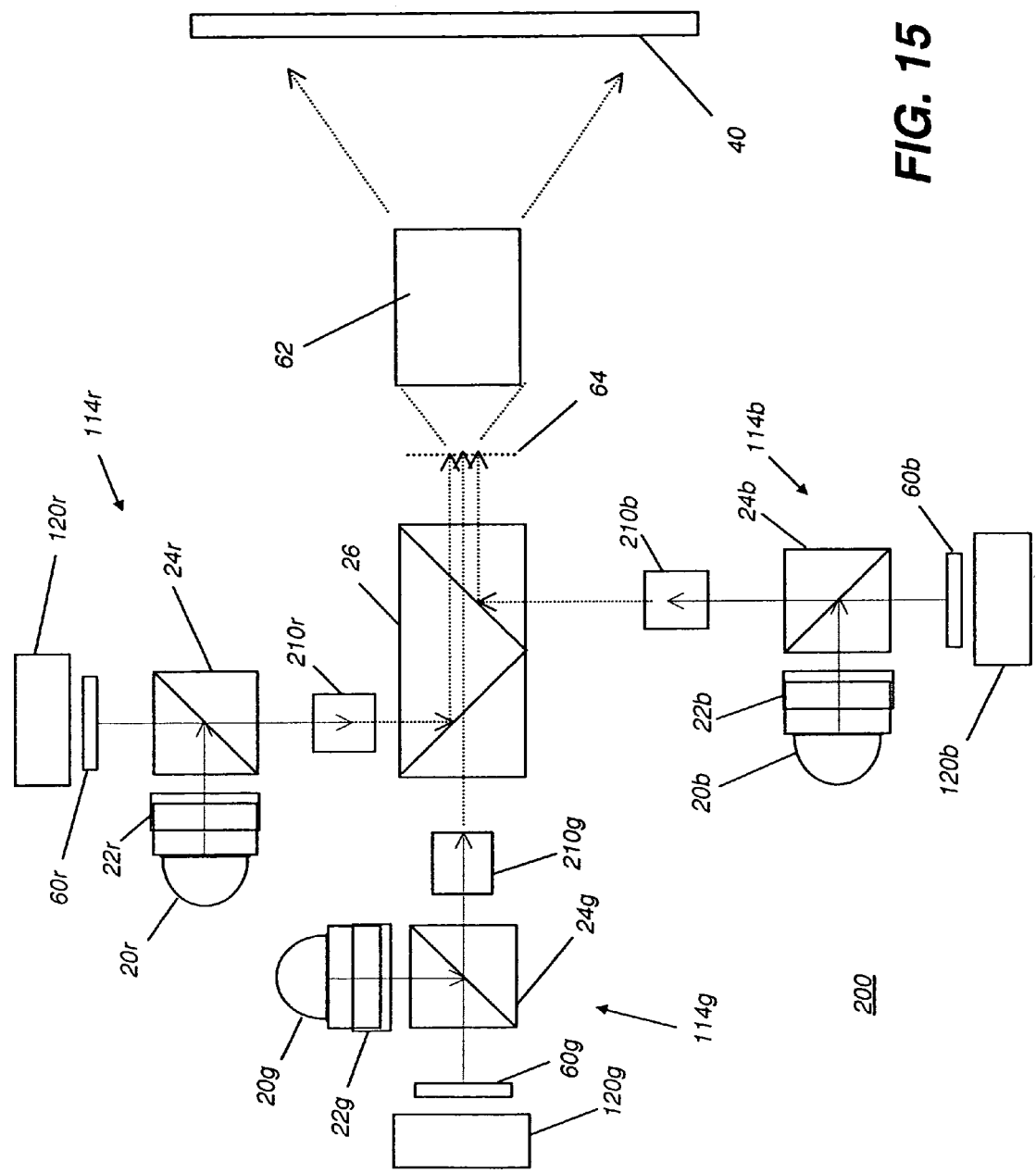
FIG. 15 is a block diagram showing a projection apparatus embodiment using relay lenses to form an intermediate image.

Another approach is to form intermediate image 64 using a relay lens in each color path. Referring to FIG. 15, there is shown a schematic diagram of projection apparatus 200 using a relay lens 210r, 210g, and 210b in each respective component wavelength modulating section 114r, 114g, and 114b. Each relay lens 210r, 210g, and 210b works in cooperation with dichroic combiner 26 to form intermediate image 64. In this configuration, wire grid polarizing beamsplitters 24r, 24g, 24b are advantaged for directing unmodulated and modulated light along distinct optical axes. The optical path lengths for red, green, and blue optical axes $O_r$, $O_g$, and $O_b$ should be equalized, using design techniques familiar to those skilled in the imaging arts.

Alternate Embodiments without Intermediate Image

Figure 16:
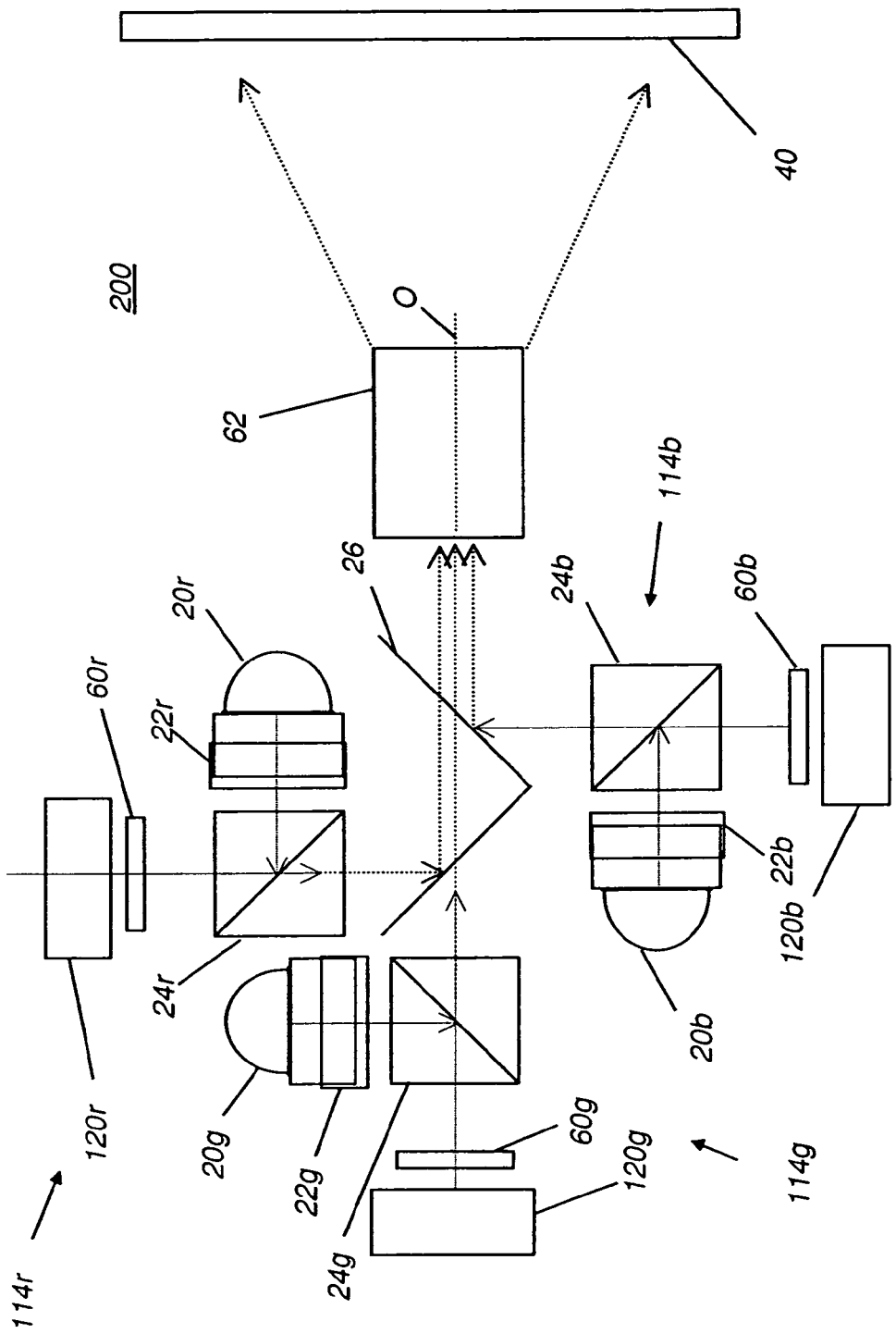
FIG. 16 is a block diagram showing a projection apparatus embodiment not forming an intermediate image.

An alternate strategy for reducing projector cost and complexity when using larger sized LC panels, driven by electromechanical grating devices, is to utilize a projection lens having a longer working distance, not forming an intermediate image and not using relay optics. Referring to FIG. 16, there is shown an embodiment of projection apparatus 200 using, as dichroic combiner 26, a V-plate assembly with a pair of dichroic surfaces oriented at right angles to each other. This arrangement works similarly to the V-cube arrangement shown in FIG. 15 and has advantages when working with a larger image beam. Each component wavelength modulating section 114r, 114g, and 114b directs light through dichroic combiner 26 to projection lens 62 along its optical axis O. As in the example of FIG. 15, equal optical path distances would be provided with the embodiment of FIG. 16.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the embodiments described hereinabove can be used to form an intermediate image, as was described with reference to FIG. 4, or to provide color modulated beams that are separately projected onto display surface 40 as was described with reference to FIG. 7.

In standard practice when using GEMS devices in any application, the diffracted orders of light generated by the GEMS device provide the useful, modulated light that is employed for forming the image. The non-diffracted zeroeth order light is obstructed, reflected back, or otherwise blocked from the imaging light path. However, it is also possible to utilize the non-diffracted, zeroeth order light for forming an image and to discard the diffracted orders. Thus, in the most general sense, the GEMS device (that is, the conformal grating electromechanical system) provides modulated light in both its diffracted orders and its and non-diffracted (zeroeth) order. Supporting components in image writing section 120 then select the appropriate orders and direct these orders to LC modulator panel 60.

While the GEMS device is described as the writing image modulation component, a grating light valve (GLV), another type of grating electromechanical system, could alternately be employed for forming the image on the LC panel. Writing of the image onto the LC panel can be done from either side of the LC panel, based on panel design. While lasers are an ideal narrow-band light source, there may be applications where an LED or an array of LEDs provides an acceptable narrow band light source 70 for image-writing section 120. Typically, a narrow-band emissive light source emits more than half its output light at a nominal wavelength, within about +/−10 nm.

Conventionally, the composite red, blue, and green images that form the full color image are generated on spatial light modulators at the same high resolution. However, using the method and apparatus of the present invention, the imaging resolution is determined by image writing section 120 rather than by LC modulator panel 60. Thus, it would be straightforward to adapt the display resolution of projection apparatus 200 to different display surfaces 40 and environments. Moreover, even resolution between two or more of modulating sections 80r, 80g, 80b could be changed. Thus, for example, the blue portion of an image might display at one resolution, with the green or green and red portions at a higher resolution.

Thus, what is provided is an apparatus and method for an electronic projection apparatus using an LC modulator panel for forming the projection image.

PARTS LIST 10 projection apparatus
20 light source
20r light source, red
20g light source, green
20b light source, blue
22 uniformizing optics
22r uniformizing optics, red
22g uniformizing optics, green
22b uniformizing optics, blue
24r polarizing beamsplitter red
24g polarizing beamsplitter, green
24b polarizing beamsplitter, blue
26 dichroic combiner
28 mirror 30r spatial light modulator, red
30g spatial light modulator, green
30b spatial light modulator, blue
32 projection lens
34 lens
36 turning mirror
38r lens, red
38g lens, green
38b lens, blue
40 display surface
42r lens, red
42g lens, green
42b lens, blue
46r red light source
46g green light source
46b blue light source
48 reflective surface
50 polarizer
52 uniformized polarized beam
54 multiple wavelength polarizer
56 lens
58 dichroic separator
60 LC modulator panel
60r LC modulator panel, red
60g LC modulator panel, green
60b LC modulator panel, blue
60c LC modulator panel, cyan
60m LC modulator panel, magenta
60y LC modulator panel, yellow
62 projection lens
62r projection lens, red
62g projection lens, green
62b projection lens, blue
64 intermediate image
66 beam
68 half wave plate
70 narrow-band light source
72 lens
74 lens
76 turning mirror
78 color separator
80r red component modulating section
80g green component modulating section
80b blue component modulating section
82r border portion, red
82g border portion, green
82b border portion, blue
84a light blocking segment
84b light blocking segment
86 dichroic separator
88r lens, red
88g lens, green
88b lens, blue
90 imaging apparatus
92 GEMS modulator
94 lens
96 filter
98 scanning element
100 display surface
102 control logic processor
104 line of modulated light
110 polarized light providing apparatus
114r red component wavelength modulating section
114g green component wavelength modulating section
114b blue component wavelength modulating section
116 field lens
118 grid
120 image writing section
120r image writing section, red
120g image writing section, green
120b image writing section, blue
124 beamsplitter
126 color filter wheel
128 lens
130 illumination apparatus
132 mirror
134 dichroic surface
136 integrator
138 light source
140 control loop
142r actuator, red
142g actuator, green
142b actuator, blue
144 sensor
146 target
148 image
150 control logic processor
160a projector section
160b projector section
200 projection apparatus
210r relay lens, red
210g relay lens, green
210b relay lens, blue
300 liquid crystal light valve
302a cover plate
302b cover plate
304a electrode
304b electrode
306a insulating film
306b insulating film
310 liquid crystal layer
312 dielectric mirror
314 light blocking layer
316 photoresponsive layer

The invention claimed is:

1. A projection apparatus comprising:
 a) an LC modulator panel, segmented into at least a first portion, a second portion, and a third portion, and wherein each portion is spatially separated from each other portion, the LC modulator panel comprising a photoresponsive layer;
 b) an image-writing section for forming a first image within the first portion, a second image within the second portion and a third image within the third portion of the LC modulator panel by scanning successive lines of image-writing light to energize the photoresponsive layer thereby, the image writing section comprising:
  (i) at least one narrow band light source for emitting a narrow band light;
  (ii) at least one grating electromechanical system for modulating the narrow band light to provide modulated light in diffracted and non-diffracted orders;
  (iii) a selecting element for blocking at least one order of the modulated light to provide a scanning light;
  (iv) a scanning element for directing the scanning light toward the LC modulator panel to energize the photoresponsive layer;
 c) an illumination section for directing first, second, and third illumination beams for modulation by the respective portions of the LC modulator panel;
 d) a polarizing beamsplitter associated with each of the first, second, and third portions for providing first, second, and third polarized illumination beams, for directing the first, second, and third polarized illumination beams toward the LC modulator panel and for directing modulated light from the LC modulator panel toward a lens for projection toward a display surface; and e) a separate polarizing beamsplitter associated with each of the first, second, and third portions.

2. A projection apparatus according to claim 1 wherein the at least one narrow band light source is a laser.

3. A projection apparatus according to claim 1 wherein the grating electromechanical system is GEMS device.

4. A projection apparatus according to claim 1 wherein the grating electromechanical system is a GLV device.

5. A projection apparatus according to claim 1 wherein the polarizing beamsplitter is wire grid beamsplitter.

6. A projection apparatus according to claim 5 wherein grids on the wire grid polarizer face the LC modulator panel.

7. A projection apparatus according to claim 1 wherein there is a single polarizing beamsplitter that serves each of the first, second, and third portions.

8. A projection apparatus according to claim 1 wherein the polarizing beamsplitter is a MacNeille type beamsplitter.

9. A projection apparatus according to claim 1 further comprising:
   a) a sensor for providing a signal indicating an overlap error between modulated light beams on the display surface;
   b) a control logic processor for monitoring the signal received from the sensor and for adjusting the position of at least one of the first, second, and third images on the LC modulator panel according to the signal; and
   c) at least one actuator for adjusting the position of at least one lens according to an instruction from the control logic processor.

10. A projection apparatus according to claim 1 wherein the light from the image-writing section and the light from at least one of the polarized illumination beams are incident on the same surface of the LC modulator panel.

11. A projection apparatus according to claim 1 wherein a light blocking member is used in separating the first portion from the second portion.

12. A projection apparatus according to claim 1 wherein the polarizing beamsplitter is stacked-film retarder.

13. A projection apparatus according to claim 1 further comprising a color combiner for combining modulated light from the first, second, and third portions of the LC modulator panel along a single optical path.

14. A projection apparatus according to claim 1 wherein an intermediate image is directed to the display surface by a projection lens.

15. A projection apparatus according to claim 1 wherein the modulated light from at least one of the first, second, and third portions is at a different resolution from one other of the portions.

16. A projection apparatus according to claim 1 wherein the selecting element blocks the zeroeth order undiffracted light.

17. A projection apparatus comprising:
   a) an LC modulator panel, segmented into at least a first portion, a second portion, and a third portion, and wherein each portion is spatially separated from each other portion, the LC modulator panel comprising a photoresponsive layer;
   b) an image-writing section for forming a first image within the first portion, a second image within the second portion and a third image within the third portion of the LC modulator panel by scanning successive lines of image-writing light to energize the photoresponsive layer thereby, the image writing section comprising:
      (i) at least one narrow band light source for emitting a narrow band light;
      (ii) at least one grating electromechanical system for modulating the narrow band light to provide modulated light in diffracted and non-diffracted orders;
      (iii) a selecting element for blocking at least one order of the modulated light to provide a scanning light;
      (iv) a scanning element for directing the scanning light toward the LC modulator panel to energize the photoresponsive layer;
   c) an illumination section for directing first, second, and third illumination beams for modulation by the respective portions of the LC modulator panel;
   d) a polarizing beamsplitter associated with each of the first, second, and third portions for providing first, second, and third polarized illumination beams, for directing the first, second, and third polarized illumination beams toward the LC modulator panel and for directing modulated light from the LC modulator panel toward a lens for projection toward a display surface; and
   wherein the light from the image-writing section is directed onto one surface of the LC modulator panel and light from one or more polarized illumination beams is directed onto the opposite surface of the LC modulator panel.

18. A projection apparatus comprising:
   a plurality of component modulating sections, each component modulating section modulating light for projection onto a display surface and comprising:
   a) an LC modulator panel comprising a photoresponsive layer;
   b) an image-writing section for forming an image on the LC modulator panel by scanning successive lines of image-writing light to energize the photoresponsive layer of the corresponding LC modulator panel thereby;
   wherein the image writing section comprises:
      (i) a narrow band light source for emitting a narrow band light;
      (ii) at least one grating electromechanical system for modulating the narrow band light to provide modulated light in diffracted and non-diffracted orders;
      (iii) a selecting element for blocking at least one order of the modulated light to provide a scanning light;
      (iv) a scanning element for directing the scanning light toward the LC modulator panel to energize the photoresponsive layer;
   c) an illumination section for directing an illumination beam toward the LC modulator panel for modulation;
   d) a polarizing beamsplitter for forming a polarized illumination beam from the illumination beam and directing the polarized illumination beam toward the LC modulator panel and for directing modulated light from the LC modulator panel toward a lens for projection toward a display surface; and
   e) a separate polarizing beamsplitter is associated with each of the component modulating sections.

19. A projection apparatus according to claim 18 wherein at least two of the LC modulator panels are disposed within a common plane.

20. A projection apparatus according to claim 19 further comprising:
   a) a sensor for providing a signal indicating an overlap error between modulated light beams on the display surface;
   b) a control logic processor for monitoring a signal received from the sensor and for adjusting a position of the image on at least one LC modulator panel according to the signal; and c) at least one actuator for adjusting the position of at least one lens according to an instruction from the control logic processor.

21. A projection apparatus according to claim 18 wherein the narrow band light source is a laser.

22. A projection apparatus according to claim 18 wherein the grating electromechanical system is a GEMS device.

23. A projection apparatus according to claim 18 wherein the grating electromechanical system is a GLV device.

24. A projection apparatus according to claim 18 wherein the polarizing beamsplitter is a wire grid beamsplitter.

25. A projection apparatus according to claim 18 wherein a single polarizing beamsplitter serves multiple component modulating sections.

26. A projection apparatus according to claim 18 wherein the polarizing beamsplitter is a MacNeille type beamsplitter.

27. A projection apparatus according to claim 18 wherein the light from the image-writing section and the light from at least one of the polarized illumination beams are incident on the same surface of the LC modulator panel.

28. A projection apparatus according to claim 18 wherein at least one selecting element blocks the zeroeth order undiffracted light.

29. A projection apparatus according to claim 18 wherein the illumination section comprises a rotating color filter.

30. A projection apparatus comprising:
   a plurality of component modulating sections, each component modulating section modulating light for projection onto a display surface and comprising:
   a) an LC modulator panel comprising a photoresponsive layer;
   b) an image-writing section for forming an image on the LC modulator panel by scanning successive lines of image-writing light to energize the photoresponsive layer of the corresponding LC modulator panel thereby;
   wherein the image writing section comprises:
      (i) a narrow band light source for emitting a narrow band light;
      (ii) at least one grating electromechanical system for modulating the narrow band light to provide modulated light in diffracted and non-diffracted orders;
      (iii) a selecting element for blocking at least one order of the modulated light to provide a scanning light;
      (iv) a scanning element for directing the scanning light toward the LC modulator panel to energize the photoresponsive layer;
   c) an illumination section for directing an illumination beam toward the LC modulator panel for modulation;
   d) a polarizing beamsplitter for forming a polarized illumination beam from the illumination beam and directing the polarized illumination beam toward the LC modulator panel and for directing modulated light from the LC modulator panel toward a lens for projection toward a display surface; and
   wherein the light from the image-writing section is directed onto one surface of the LC modulator panel and light from one or more polarized illumination beams is directed onto the opposite surface of the LC modulator panel.

31. A projection apparatus comprising:
   first and second projector sections, wherein each projector section modulates a plurality of light wavelengths and comprises:
   an LC modulator panel, segmented into at least a first portion, a second portion, and a third portion, and wherein each portion is spatially separated from each other portion, the LC modulator panel comprising a photoresponsive layer;
   an image-writing section for forming a first image within the first portion, a second image within the second portion and a third image within the third portion of the LC modulator panel by scanning successive lines of image-writing light to energize the photoresponsive layer thereby,
   the image writing section comprising:
      (i) a narrow band light source for emitting a narrow band light;
      (ii) at least one grating electromechanical system for modulating the narrow band light to provide modulated light in diffracted and non-diffracted orders;
      (iii) a selecting element for blocking at least one order of the modulated light to provide a scanning light;
      (iv) a scanning element for directing the scanning light toward the LC modulator panel to energize the photoresponsive layer;
   an illumination section for providing first, second, and third illumination beams for modulation by the respective portions of the LC modulator panel;
   a polarizing beamsplitter associated with each of the first, second, and third portions for directing first, second, and third polarized illumination beams toward the LC modulator panel and for directing modulated light from the LC modulator panel toward a lens for projection toward a display surface; and
   a separate polarizing beamsplitter associated with each of the first, second, and third portions.

32. A projection apparatus according to claim 31 wherein the LC modulator panel of the first projector section modulates red, green, and blue light.

33. A projection apparatus according to claim 31 wherein the LC modulator panel of the second projector section modulates cyan, magenta, and yellow light.

34. A projection apparatus according to claim 31 wherein the LC modulator panels are disposed within a common plane.

35. A projection apparatus according to claim 31 wherein the narrow band light source is a laser.

36. A projection apparatus according to claim 31 wherein the grating electromechanical system is a GEMS device.

37. A projection apparatus according to claim 31 wherein the grating electromechanical system is a GLV device.

38. A projection apparatus according to claim 31 wherein the polarizing beamsplitter is wire grid beamsplitter.

39. A projection apparatus according to claim 38 wherein grids on the wire grid polarizer face the LC modulator panel.

40. A projection apparatus according to claim 31 wherein there is a single polarizing beamsplitter that serves each of the first, second, and third portions.

41. A projection apparatus according to claim 31 wherein the polarizing beamsplitter is a MacNeille type beamsplitter.

42. A projection apparatus according to claim 31 further comprising:
   a) a sensor for providing a signal indicating an overlap error between modulated light beams on the display surface;
   b) a control logic processor for monitoring the signal received from the sensor and for adjusting the position of at least one of the first, second, and third images on the LC modulator panel according to the signal; and
   c) at least one actuator for adjusting the position of at least one lens according to an instruction from the control logic processor.

43. A projection apparatus according to claim 31 wherein the light from the image-writing section and the light from at least one of the polarized illumination beams are incident on the same surface of the LC modulator panel.

44. A projection apparatus according to claim 31 wherein a light blocking member is used in separating the first portion from the second portion.

45. A projection apparatus according to claim 31 wherein the polarizing beamsplitter is stacked-film retarder.

46. A projection apparatus according to claim 31 further comprising a color combiner for combining modulated light from the first, second, and third portions of the LC modulator panel along a single optical path.

47. A projection apparatus according to claim 31 wherein an intermediate image is formed and directed to the display surface using a projection lens.

48. A projection apparatus according to claim 31 wherein the modulated light from at least one of the first, second, and third portions is at a different resolution from one other of the portions.

49. A projection apparatus according to claim 31 wherein the selecting element blocks the zeroeth order undiffracted light.

50. A projection apparatus according to claim 31 wherein the illumination section comprises a rotating color filter.

51. A projection apparatus comprising:
  first and second projector sections, wherein each projector section modulates a plurality of light wavelengths and comprises:
  an LC modulator panel, segmented into at least a first portion, a second portion, and a third portion, and wherein each portion is spatially separated from each other portion, the LC modulator panel comprising a photoresponsive layer;
  an image-writing section for forming a first image within the first portion, a second image within the second portion and a third image within the third portion of the LC modulator panel by scanning successive lines of image-writing light to energize the photoresponsive layer thereby,
  the image writing section comprising:
    (i) a narrow band light source for emitting a narrow band light;
    (ii) at least one grating electromechanical system for modulating the narrow band light to provide modulated light in diffracted and non-diffracted orders;
    (iii) a selecting element for blocking at least one order of the modulated light to provide a scanning light;
    (iv) a scanning element for directing the scanning light toward the LC modulator panel to energize the photoresponsive layer;
  an illumination section for providing first, second, and third illumination beams for modulation by the respective portions of the LC modulator panel;
  a polarizing beamsplitter associated with each of the first, second, and third portions for directing first, second, and third polarized illumination beams toward the LC modulator panel and for directing modulated light from the LC modulator panel toward a lens for projection toward a display surface; and
  wherein the light from the image-writing section is directed onto one surface of the LC modulator panel and light from one or more polarized illumination beams is directed onto the opposite surface of the LC modulator panel.

* * * * *